United States Patent [19]

Boenke et al.

[11] Patent Number: 5,438,653
[45] Date of Patent: Aug. 1, 1995

[54] METHOD AND SYSTEM FOR COLOR FILM SEPARATION PREPROCESS USING ELECTRONIC OBJECT-BASED CHOKING AND SPREADING PROCEDURES INCLUDING OBJECT COMBINING OPERATIONS

[75] Inventors: Marke Boenke, Santa Rosa; Derek Clegg, San Francisco; Mike Gittelsohn, Berkeley; Keith Passaretti, San Francisco; Audrey Seymour-Marks, Woodacre, all of Calif.

[73] Assignee: Island Graphics Corporation, San Rafael, Calif.

[21] Appl. No.: 68,721

[22] Filed: May 26, 1993

Related U.S. Application Data

[63] Continuation-in-part of Ser. No. 747,783, Aug. 20, 1991.

[51] Int. Cl.⁶ .............................................. G06F 15/00
[52] U.S. Cl. .................................................... 395/131
[58] Field of Search ..................... 395/142, 131, 133; 345/153, 154, 155; 358/76, 80

[56] References Cited

U.S. PATENT DOCUMENTS 5,115,479  5/1992  Murayama .......................... 382/56
5,134,688  7/1992  Corthout ............................ 395/142

*Primary Examiner*—Phu K. Nguyen
*Attorney, Agent, or Firm*—Townsend and Townsend Khourie and Crew

[57] ABSTRACT

A computer system for production of ink separations from an object-based print pre-process apparatus using a page description language. The print pre-process system facilitates creation of object spreads for any combination or configuration of objects on the rendered page. For each object on a rendered page, the computer system 100 makes use of a spread table to determine spread incidences. For each spread incidence, the computer system generates set union, intersection, difference, and edge extraction for spreading, receiving, and obstructing objects to create a simplified graph of contour histories providing a visible portion of the spread object. The visible boundary between the visible spread object and the receiving object is then extracted. The visible boundary is strokeable within a clipped window set to the receiving object. The stroke color and width, set by the spread table, can be knockout print or overprint. Alternatively, the visible spread boundary with given spread width can be cropped away from certain separations of the receiving object, rather than being stroked in a solid color.

35 Claims, 19 Drawing Sheets

METHOD AND SYSTEM FOR COLOR FILM SEPARATION PREPROCESS USING ELECTRONIC OBJECT-BASED CHOKING AND SPREADING PROCEDURES INCLUDING OBJECT COMBINING OPERATIONS

CROSS-REFERENCE TO RELATED APPLICATIONS

This application is a continuation-in-part of U.S. patent application Ser. No. 07/747,783, filed Aug. 20, 1991, titled METHOD AND SYSTEM FOR COLOR FILM SEPARATION PRE-PROCESS USING ELECTRONIC OBJECT-BASED CHOKING AND SPREADING PROCEDURES INCLUDING OBJECT COMBINING OPERATIONS, hereby expressly incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent files or records, but, otherwise, reserves all copyright rights whatsoever.

MICROFICHE APPENDIX

This specification includes microfiche Appendix I having 2 sheets with 119 frames, hereby expressly incorporated by reference for all purposes.

BACKGROUND OF THE INVENTION

The present invention relates generally to apparatus and methods for reducing print misregistrations in color printing, and, more specifically, to object-based choking and spreading procedures that include object combining operations for generation of color film separations.

Printing is well known. To print in color, a printing machine combines a plurality of color images from each of a plurality of platens. Each platen reproduces a portion of a final combined image from a plate pressed onto a recording medium. Photographic procedures create each plate from a film. A film for each plate typically corresponds to one primary color, with a set of films referred to as a set of film separations. FIG. 4 is an illustration of a set of film separations using cyan, magenta, yellow and black primary colors. The separations produce a plurality of plates for a printing machine. By varying particular color amounts contributed by each film separation to a final combined image, a large variety of colors for the combined image is possible. FIG. 5 is a schematic representation of one example of a printing press for color images. The printing press includes multiple platens, one for each separation layer as identified in FIG. 4, for example. Each roller adds its respective color, as identified by its plate created from its corresponding film, to a recording medium passing beneath the platen. Each subsequent platen contributes its color to the recording medium until all platens have contributed their respective colors to the final image. Each color's contribution to any particular part of the final image is variable from zero percent to one hundred percent.

The method requires precise synchronization and alignment of the platens to each other and to the advancing recording medium. Any positional or timing error in laying down the individual patterns of each color separation results in improper alignment of the various images. The printing industry refers to this improper alignment as print misregistration.

FIG. 6A is an illustration of a desired registration of a black text character "a" on a cyan background. If there is some error in recording of either the character "a" or the background, misregistration results. FIG. 6B is an illustration of a misregistration of the character "a" on its cyan background. The misregistration is particularly noticeable in that the misregistration exposes portions of the recording medium which were not inked. The fact that each color of the FIG. 6B image is a single ink (contribution from a single platen) makes misregistration more likely. To avoid this problem, printers long ago developed photographic techniques called choking and spreading to make misregistration less noticeable. Choking and spreading refers to controlling the images of the film separations to compensate for misregistration. Rather than requiring exact alignment of the respective images of the film separations, the film separation allows overlap of the various colors. Thereafter, small misalignments are not as noticeable.

Typically, in spreading and choking, the lighter color overlaps the darker color. Printers perceived that a dark area with a lighter color mixed in was less noticeable than either a white border around mismatched images, or darker colors in lighter images. Thus, a region bordering images of different colors which abut one another is actually made a third color.

Spreading refers to enlarging an object on top of its background, while choking refers to enlarging a background to overlap the object. These photographic techniques include actual enlargement of the subject image.

Pre-press processing systems generate the film separations for use in color printing. It is known to use computer-assisted, pre-press systems to facilitate generating film separations. The computer-assisted, pre-press systems electronically store the various object and background images. A pre-press system operator can electronically manipulate the various images to choke or spread a desired image onto another object. These pre-press systems typically store a page as a large rasterized image having an array of pixels. The rasterized image associates each pixel with four color bytes. Typical pixel densities range from about 50 dots per inch (DPI) to about 2000 DPI, with 300 DPI common. Thus, representing an ordinary notebook size page of 8.5"×11" requires over 32 million bytes at a resolution of 300 DPI with four color bytes per pixel. Special encoding reduces the size of the raster, but as the number of pages increases, the total memory requirements become unwieldy. Image storage is a disadvantage with these systems. Spreading and choking is relatively easy with rasterized images because the system knows each image's pixel value and position. Changing particular images is straightforward.

Another disadvantage of the rasterized approach relates to editing and changing the images. Unless an unlimited amount of image storage capability is available, spreading with rasterized images is a one-way process. Reversing one or more spread steps is difficult unless the operator stores each intermediate result prior to executing a subsequent spreading step. For example, if a customer desires to change a font in a headline, the operator typically performs all the spreading, choking and editing operations again from a rasterized image with the new font.

Current page layout and illustration products, including QuarkXPress (available from Quark, Incorporated), Aldus Freehand (available from Aldus Corporation), and Adobe Illustrator (available from Adobe Systems Incorporated) for the Macintosh provide functionality to choke and spread ink separations in limited situations. These systems offer an advantage over prior art raster systems memory storage and editing limitations because they are object-based systems. The information stored to recreate a page is less than with the raster system, saving disk storage space. Additionally, the user can re-edit jobs without starting from an initial drawing and recreating all the chokes, spreads and other operations anew. The object-based systems output results in a page description language rather than as encoded rasters. Prior art systems have limited choking and spreading functionality dependent upon a particular page description language the system employs.

Object-based systems use a page description language to define objects on a rendered page of a display medium, such as a video display terminal (VDT) or a printed page. The page description language defines each object with a path which traces its outline. Rendering is the process of either filling a path with a fill color, stroking a path with a stroke color, or flowing text within an object's path.

"PostScript" is a commonly used page description language. Adobe Systems, Inc. created and promulgates the PostScript language. PostScript functionality and definitions are defined in "PostScript Language Reference Manual" Addison-Wesley Publishing Co., Inc., 1985, hereby incorporated by reference for all purposes.

Existing systems typically depend upon four page-description-language-related features to perform spreading and choking. These four operations include fill (and eofill), stroke, overprint and clip (and eoclip). The fill operator paints an interior of an object a specified color. The stroke operator produces a variable width line of specified color centered on a stroked object's outline. The overprint operator is used to generate ink separations. Overprint allows addition of color to selected separations when drawing an object without altering other separations. The alternative is knockout printing, which automatically overwrites all non-painted separations with white. The clip operator limits an extent of a rendering region on a page.

A simple prior art solution to spreading is to render a stroke of a spreading object using overprint to overlap a particular color into an abutting color. Unless the spreading object lies completely within the interior of the choked object, this method will produce distorted spread objects as the spread object will extend into inappropriate areas. A next level of spreading complexity uses the clipping operator to limit all renderings to an area lying within the object receiving the spread. Subsequent stroke overprinting only appears within an area of overlap, that is, where the stroked object falls within the object receiving the spread.

This improved prior art spreading mechanism has limitations in at least five situations. A user faced with one of these situations must either alter the design, or employ the raster-type system.

1. A user cannot stroke an object and subsequently spread the stroke into an abutting object's fill or stroke. Only an object's fill can spread into another object's fill. Current page description languages do not permit a stroke to follow the outline of the stroke of an object.
2. Obstructors, additional objects lying on top of the spreading object, prevent spreading because the outline of the spreading object no longer defines the boundary to be spread across.
3. Some page description languages do not have an overprint feature, preventing formation of overlapping colors from different objects.
4. Even if none of the previous three limitations are present, the prior art method will provide an incorrect result in certain cases when the spreading object lies under the receiving object. If one or more edges of the spreading object lie exactly under edges of the receiving object, then stroking either the spreading object or the receiving object produces the wrong result. This is because where their outlines overlap, neither outline separates the two colors, but rather borders the background.
5. A user cannot spread an image or gradient into another object using these techniques, since stroking the outline would be an incorrect way of extending either an image or a gradient.

SUMMARY OF THE INVENTION

The present invention provides a method and apparatus for spreading one object into a second abutting or overlapping object without the limitations of the prior art. The present invention offers the extensions needed to spread any object into any object.

One preferred embodiment of the present invention defines all objects with a page-description-language path and several zones. The zones include a fill zone, a border zone, and a text zone.

For any combination of objects having one or more of the zones, the present invention calculates the outline of the spreading boundary for the set of objects. Set operations of union, intersection and difference for the overlapping objects define a new object. The new object is the visible portion of the spreading object whose outline contains the spreading boundary. This outline of the visible spreading object can be either stroked or subtracted away. That portion of this outline that makes up the boundary between the visible stroking object and the receiving object is extracted. Then the system limits the page to the interior of the object receiving the spread.

In most cases, stroking this common boundary with a knockout color of a user's choice spreads the desired object into the receiving object. The knockout color permits control over the blending of the spreading and receiving objects' color that is better in some instances than the automatic blending of overprinting. The user could use overprinting, if desired.

To spread objects, such as an image or a gradient, an alternate method is required, because stroking such an object's outline with any single color does not extend them properly. In these cases, each designated receiving object is choked by subtracting the shape of the spread boundary from its shape in the appropriate separations using the set difference operation. This prevents the receiving object from knocking out all overlap with an image or gradient.

DESCRIPTION OF A PREFERRED EMBODIMENT

Figure 1:
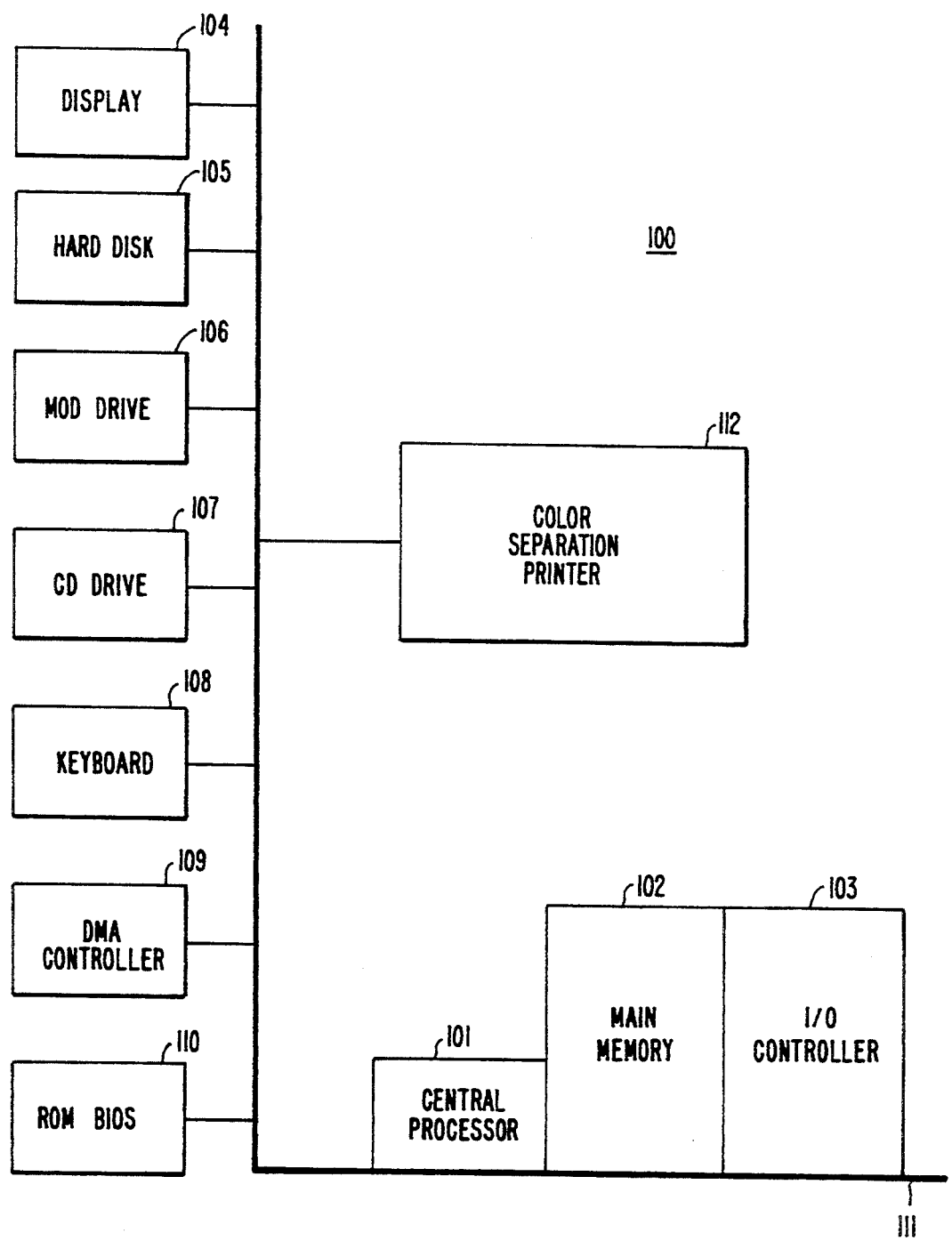
FIG. 1 is a block diagram of one example of a computer system 100 in which the present invention may be embodied.

FIG. 1 is a block diagram of one example of a computer system 100 in which the present invention may be embodied. The computer system 100 includes a central processor 101, a main memory 102, an input/output (I/O) controller 103, a display monitor 104, a fixed disk (hard disk) 105, a magnetic optical disk (MOD) drive 106, a compact disk (CD) drive 107, keyboard 108, direct memory access (DMA) controller 109, and read-only memory (ROM) 110. A system bus 111, or similar structure, allows these components to exchange information with each other and with a color separation printer 112. The color separation printer 112 may be any of well-known prior art devices which generate color film separations from appropriate information supplied by the computer system 100.

In operation, a user enters commands or data through the keyboard 108 or other input/output device, such as a mouse. The computer system 100 outputs information on the display 104 or the color separation printer 112. In one preferred embodiment, the present invention employs an appropriately programmed Macintosh personal computer (Apple Computers, Inc.).

While description of the preferred embodiment proceeds by reference to a particular computer system 100, different embodiments employ a wide variety of computer systems. The present invention is an interactive computer system which either generates or imports a plurality of graphic objects defined by a page description language, such as PostScript, into its main memory 102. The plurality of objects define a printed color page. It is desirable to minimize print misregistration when a printer actually prints the page using a set of ink separations produced by the color separation printer 112. A preprocess operator selects one of the objects for spreading. The user operates the mouse to identify a particular object for spreading. The computer system 100 prompts the user for information to complete a spreading table for the selected object. The spreading table associated with each object includes information regarding a spreading zone, a spreading zone color, a receiving zone, a receiving zone color, a spread color, and a spread amount.

Figure 2:
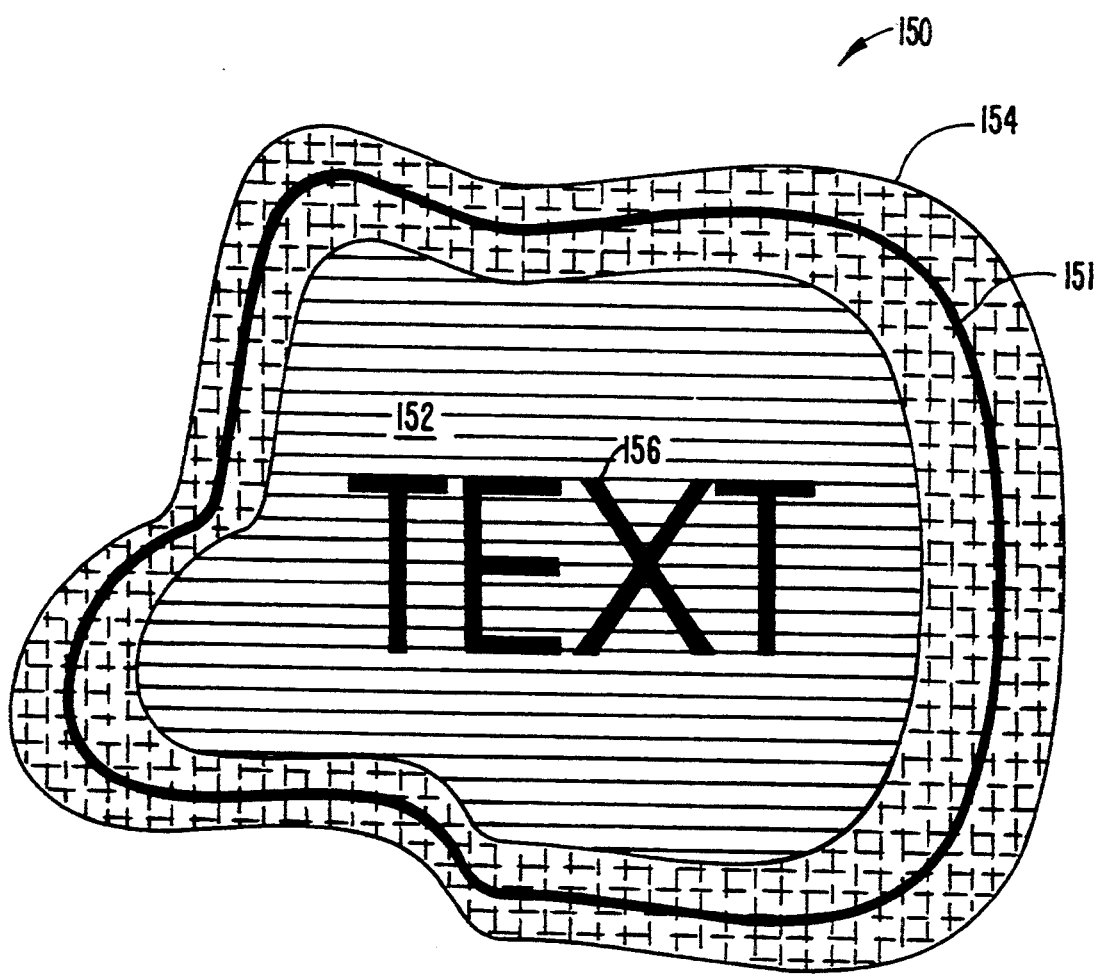
FIG. 2 is an illustration of one example of an object 150 rendered on the display 104.

FIG. 2 is an illustration of one example of an object 150 rendered on the display 104. The object 150 has an outline 151 which identifies a closed path. As is well known, any closed path has an interior determined by an "insideness rule", such as a winding-number rule or an even-odd rule. The object 150 has a lowermost zone referred to as a fill zone 152. One attribute of the object 150 is that it includes a particular fill color for the fill zone 152. A border 154 results from stroking the outline 151 with a stroke color having a stroke width. Stroking the outline 151 results in centering the border 154 on the outline 151. The border is rendered on top of the fill zone 152. The object 150 can have text 156 flowed over the fill zone 152. The text 156 includes an associated color and is in the uppermost zone of the particular object. The preferred embodiment treats the fill 152, the border 154, and the text 156 as different zones of the object 150. The preferred embodiment considers each zone of each object to be a closed path. This permits the object 150 to have its border 154 spread against its fill 152 (and vice versa). Converting each border 154 zone and each text 156 zone into a closed path allows identical treatment for all the zones.

Figure 3:
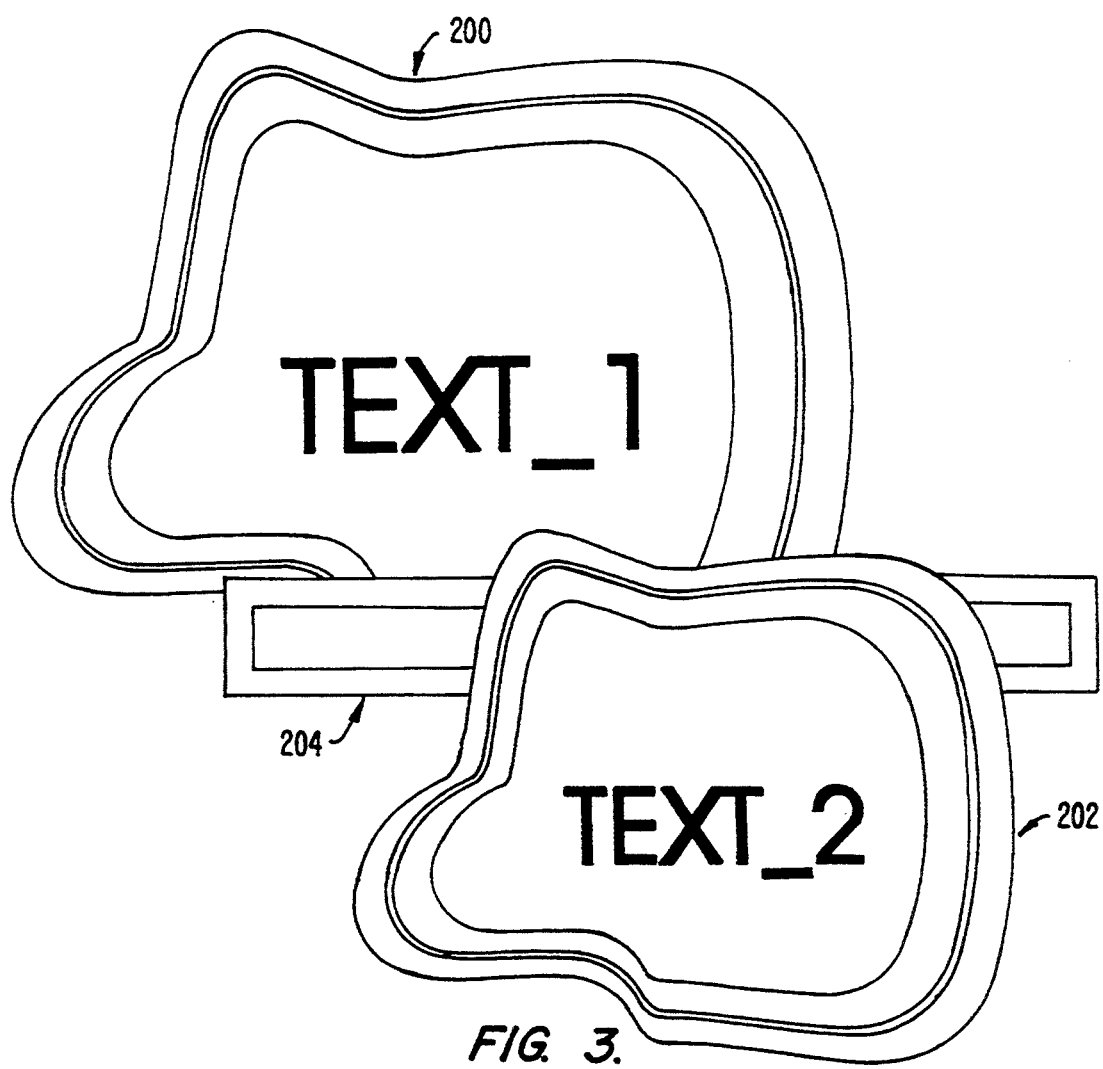
FIG. 3 is an illustration of a possible spreading incidence in which a lighter colored first object 200 has an overlying darker colored second object 202.
Figure 4:
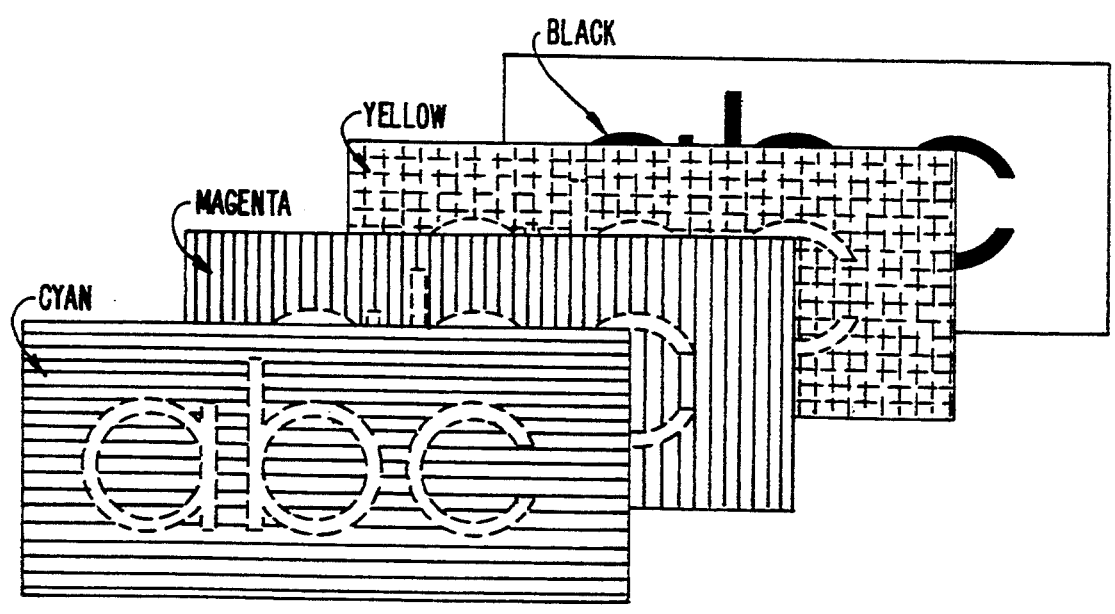
FIG. 4 is an illustration of a set of film separations using cyan, magenta, yellow and black primary colors.
Figure 5:
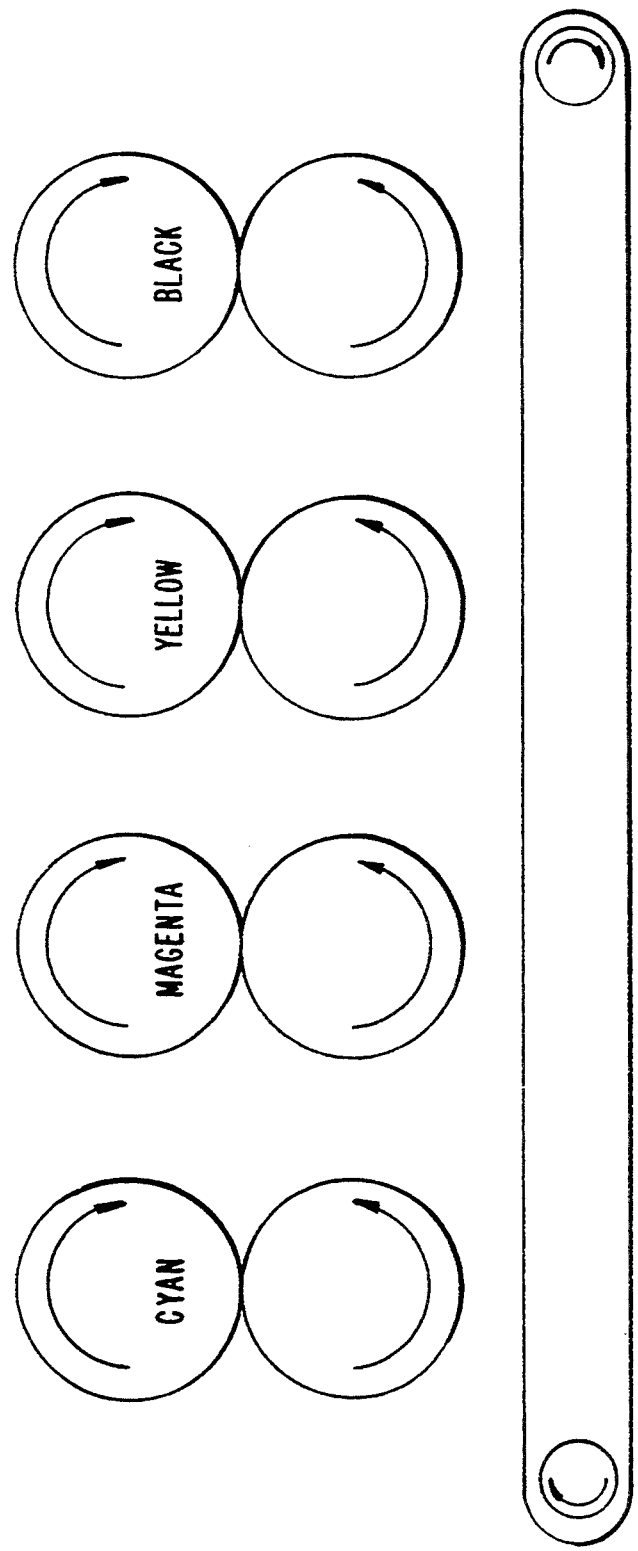
FIG. 5 is a schematic representation of one example of a printing press for color images.
Figure 6A:
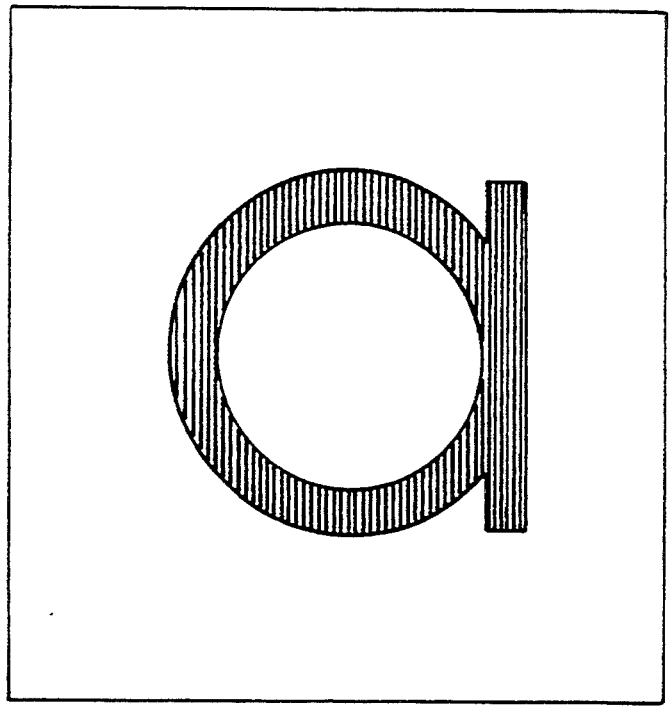
FIG. 6A is an illustration of a desired registration of a black text character "a" on a cyan background.
Figure 6B:
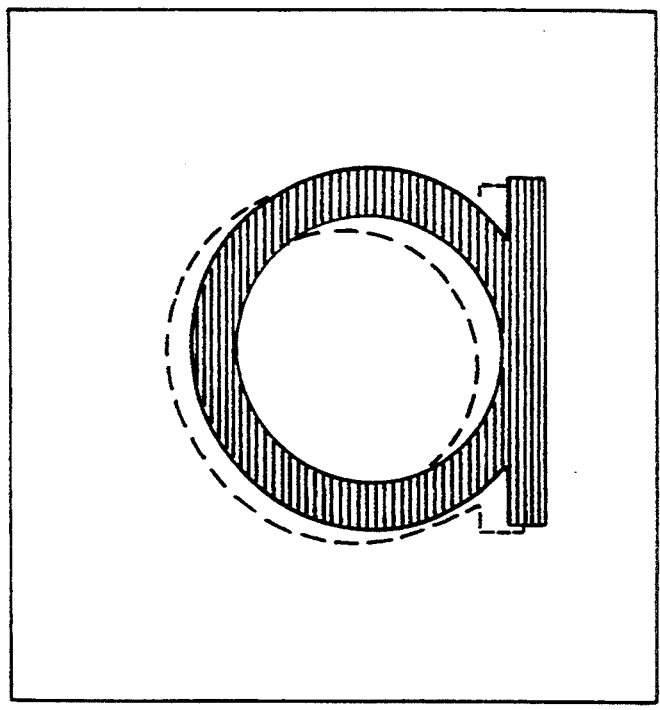
FIG. 6B is an illustration of a misregistration of the character "a" on its cyan background.

FIG. 3 is an illustration of a possible spreading incidence in which a lighter colored first object 200 has an overlying darker colored second object 202. An obstructor 204 lies between the first object 200 and the second object 202. The obstructor 204 represents any object lying between the first object 200 and the second object 202. For purposes of the following description, the first object 200 has a fill color of 100% yellow, and a border color of 75% yellow and 25% magenta. The second object 202 has a border color of 100% cyan, and a fill color of 50% magenta and 50% cyan. Text of the first object 200 and the second object 202 is 100% black. The obstructor 204 has a 100% black border over a white fill. Other color combinations are possible, and no limitation of the present invention is intended by the particular choice of the illustration of FIG. 3.

The user selects the first object 200 to make an entry in the first object's spreading table. An intersect zone is a zone in which a spread will actually occur and is equivalent to the receiving zone. The preferred embodiment paints all spreads which should appear over the intersect zone after it paints the intersect zone.

Table 1 is one example of a spreading table for the first object 200. The first object 200 intersects both the second object and the obstructor 204. To have the first object 200 spread against all objects, except for those that are 100% black, the following entries are made.

TABLE 1

| # | Object Color | Receiving Color | Spread Color | Spread Amount |
|---|---|---|---|---|
| 1 | 100% Yellow (Fill) | ANY | 100% Cyan | 0.1 |
| 2 | 75% Yellow 25% Magenta (Border) | ANY | 100% Cyan | 0.1 |
| 3 | 100% Yellow (Fill) | 100% Black | N/A | 0.0 |
| 4 | 75% Yellow 25% Magenta (Border) | 100% Black | N/A | 0.0 |
| n | ... | ... | ... | ... |

Spread amount is measured in inches in the preferred embodiment.

After painting the obstructor object 204, the preferred embodiment checks all the objects (the first object 200, the second object 202, and the obstructor 204) to see if they should spread against the obstructor 204. As the first object 200 is the only object having a defined spread table in this example, it is the only object which can spread. The first object 200's spread table is checked backward from a last entry to a first entry. Entries #4 and #3 indicate that when either the fill or the border of the first object 200 abuts the obstructor object 204, it spreads by 0 inches. Therefore, no object spreads onto the obstructor 204.

After painting the second object 202, the preferred embodiment checks all the objects (the first object 200, the second object 202, and the obstructor 204) to see if they should spread against the second object 202. Checking the first object 200's spread table again produces entries #2 and #1 to control the spreading. As the receiving color of entries #2 and #1 is ANY, both the border and the fill of the first object 200 spread into the second object 202. The first object spreads 0.1 inch of 100% cyan into the border of the second object.

The following series of steps describes how to render any object receiving spreading from a solid-color object. For each receiving zone, in this case the border of the second object 202, the computer system 100 paints the receiving zone. For each zone to spread into the receiving zone, that is the fill and the border of the first object 200, the preferred embodiment constructs an initial temporary object from the spreading zone. Subtracting or clipping out all obstructors (the obstructor 204) and any croppers of the spreading object from the initial temporary object creates a final temporary object which is the visible or exposed portion of the spreading zone. The outline of this object is strokeable. A spreading boundary is extracted from that portion of the outline separating the visible spread zone from the receiving zone. A subsequent stroke of this spreading boundary constructed from each spreading zone with the spread color and spread width from the spread table, results in spreading the first object 200's fill and border into the second object 202 and not into the obstructor 204. To complete the process, the preferred embodiment deletes the temporary object.

The following series of steps describes how to render any object receiving spreading from an underlying continuous-tone object, such as an image or gradient. The receiving zone cannot be immediately rendered as in the previous example, because it must be choked first. Choking includes subtracting or cropping out from certain separations the shapes of all the spreads that will be received. This allows a region of true overlap or spread between the image and the receiving object, rather than having the overlying object completely knock out the image where they overlap.

Suppose that in FIG. 3 the underlying object 200 contained an image, and that the darker overlying object 202 had a superblack border with 100% black and 50% magenta. For each receiving zone, i.e. the border of the second object 202, the preferred embodiment constructs an initial temporary object from the receiving zone. Then, for each continuous-tone spreading zone bordering this receiving zone, a secondary temporary object is constructed from the spreading boundary; the steps to construct a spreading boundary are delineated in the previous example above. Subtracting or cropping out each spreading boundary object from the appropriate separations results in a final temporary object which is the choked receiving zone. In this example, the magenta separation would be choked because it is the lighter color; choking the black separation would noticeably change the shape of the overlying object. Once this choking of the receiving zone is complete, the computer system 100 paints the choked receiving zone. The process is completed by deleting the final temporary object.

The set of steps described above can be implemented in many different ways in many different systems. FIG. 7 through FIG. 20 are a set of flowcharts detailing implementation of the preferred embodiment in the source code module included in Appendix I. The section of the C compiler code included in the Appendix identifies a series of steps under the heading "render__prim.c".

Figure 7:
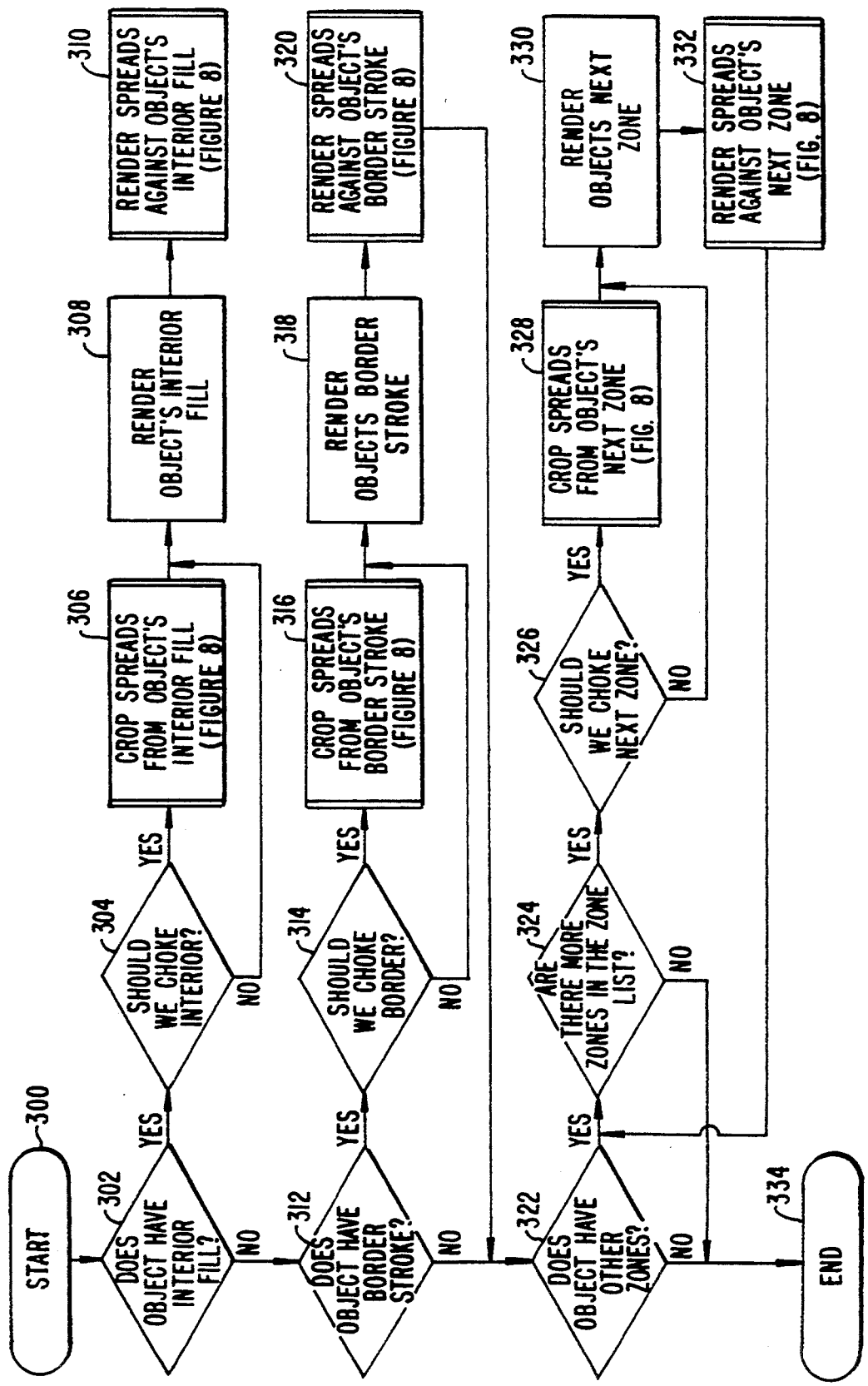
FIG. 7 is a flowchart illustrating operation of a topmost calling routine, identified as "VeRenderPrim" of the source code of Appendix I.

FIG. 7 is a flowchart illustrating operation of a topmost calling routine, identified as "VeRenderPrim" of the source code of Appendix I. The VeRenderPrim routine, for each object, renders all the zones of the object with any choking and with any received spreading against each zone. In the code, a "prim" data structure represents objects. "Spread_prim" identifies the spreading object, and "intersect_prim" identifies the receiving object.

The VeRenderPrim routine begins at step 300 with an object to render. Rendering all the object's zones and rendering any spreads against the zones completes the routine at step 334.

If the object has an interior fill, the routine first checks if the interior must be choked in step 304. If so, the appropriate spreads are cropped away from the interior in step 306. In either case, the resulting interior fill is then rendered in step 308. Then, the solid-color spreads are rendered against the object's interior in step 310.

After completing step 310, or step 302 if the object did not have an interior fill, the routine next checks for a border stroke in step 312. If the object has a border stroke, the routine tests whether the border stroke must be choked in step 314. If so, the appropriate spreads are cropped away from the border in step 316. In either case, the resulting border stroke is then rendered in step 318. Then, the solid-color spreads are rendered against the object's border stroke in step 320.

After completing step 320, or step 312 if the object did not have a border stroke, the routine checks for the existence of other zones in step 322. If there are more zones, the routine gets the next zone in step 324 and tests whether to choke it in step 326. If choking is needed for this zone, the appropriate spreads are cropped away in step 328. In either case, the resulting zone is rendered in step 330, and the solid-color spreads are rendered against it in step 332. Then, the routine checks for the existence of any remaining zones in the zone list in step 324 again. If there are more remaining zones, the rendering process is repeated as above for each zone, until the zone list is empty. When the test in step 324 yields an empty list, the process terminates in step 334.

Figure 8:
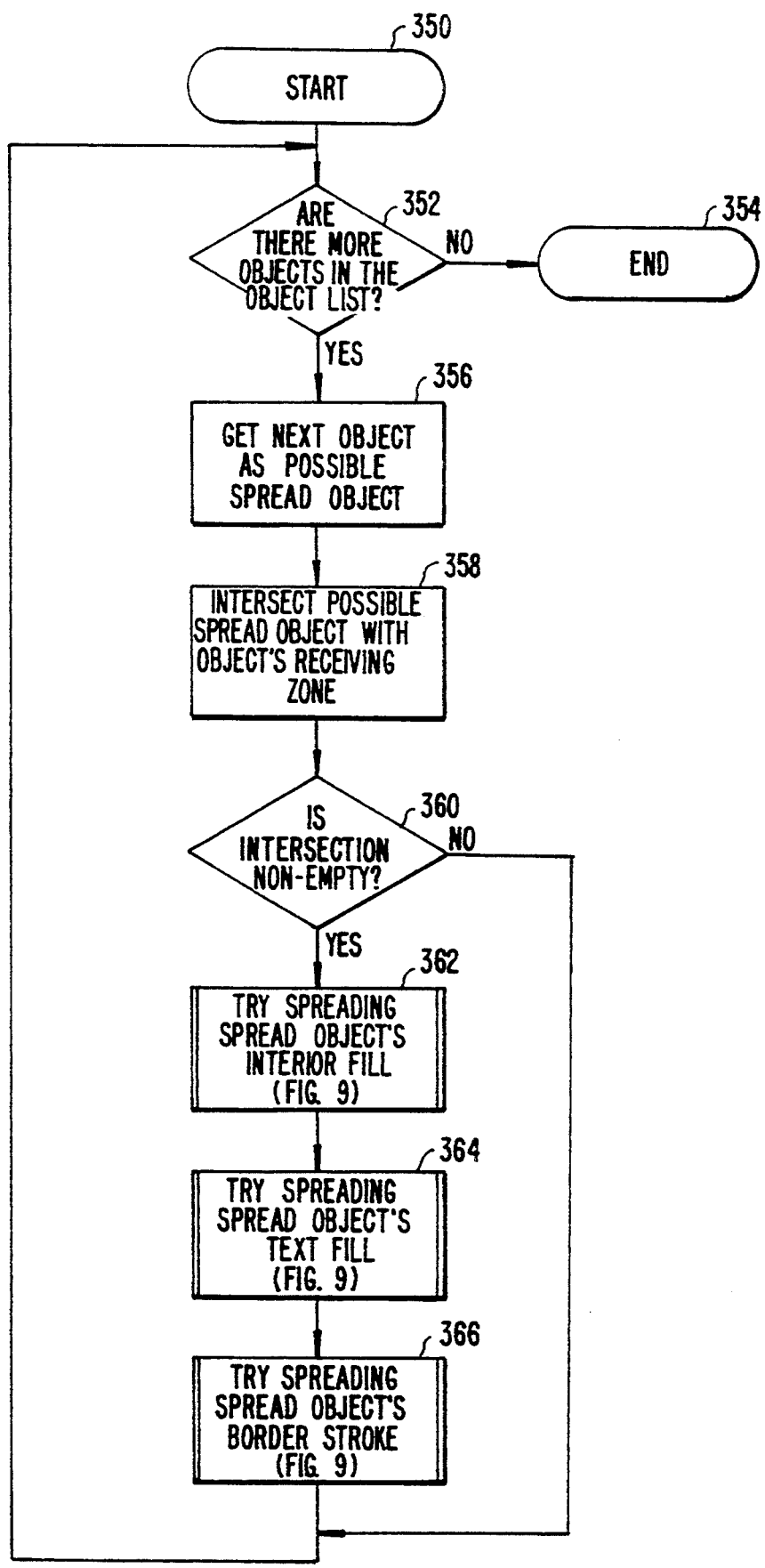
FIG. 8 is a flowchart illustrating operation of a routine, called by VeRenderPrim and identified as "VeRenderSpreadAgainst" of the source code of Appendix I.

FIG. 8 is a flowchart illustrating operation of a routine, called by VeRenderPrim and identified as "veRenderSpreadAgainst" of the source code of Appendix I. The veRenderSpreadAgainst routine includes a set of steps called by the steps 310, 320 and 332 of FIG. 7. The veRenderSpreadAgainst routine includes a subroutine identified as "VE_APPLY_TO_DL" that is applied to the entire object list. The VE_APPLY_TO_DL routine uses "prim_intersect_spread_func" which provides preliminary testing for possible spread cases.

Calling the veRenderSpreadsAgainst routine executes step 350 through step 366. After starting at step 350, the routine checks an object list for more objects at step 352. If no more objects are in the object list, at step 354 the routine returns to the calling routine. One or more objects remaining in the object list at step 352 results in the routine getting a next object as a possible spread object at step 356. At step 358, the routine intersects the possible spread object with the object's receiving zone. Step 360 checks the intersection to determine if the intersection is non-empty. An empty intersection causes the routine to return to the step 352 to check for more objects in the object list.

A non-empty intersection at the step 360 causes the routine to try spreading the spread object's different zones successively. Step 362 tries to spread the spread object's interior fill. Step 364 tries to spread the spread object's text fill. Step 366 tries to spread the spread object's border stroke. After trying each of the spreads, the routine returns to the step 352 to check for more objects in the object list.

Figure 9:
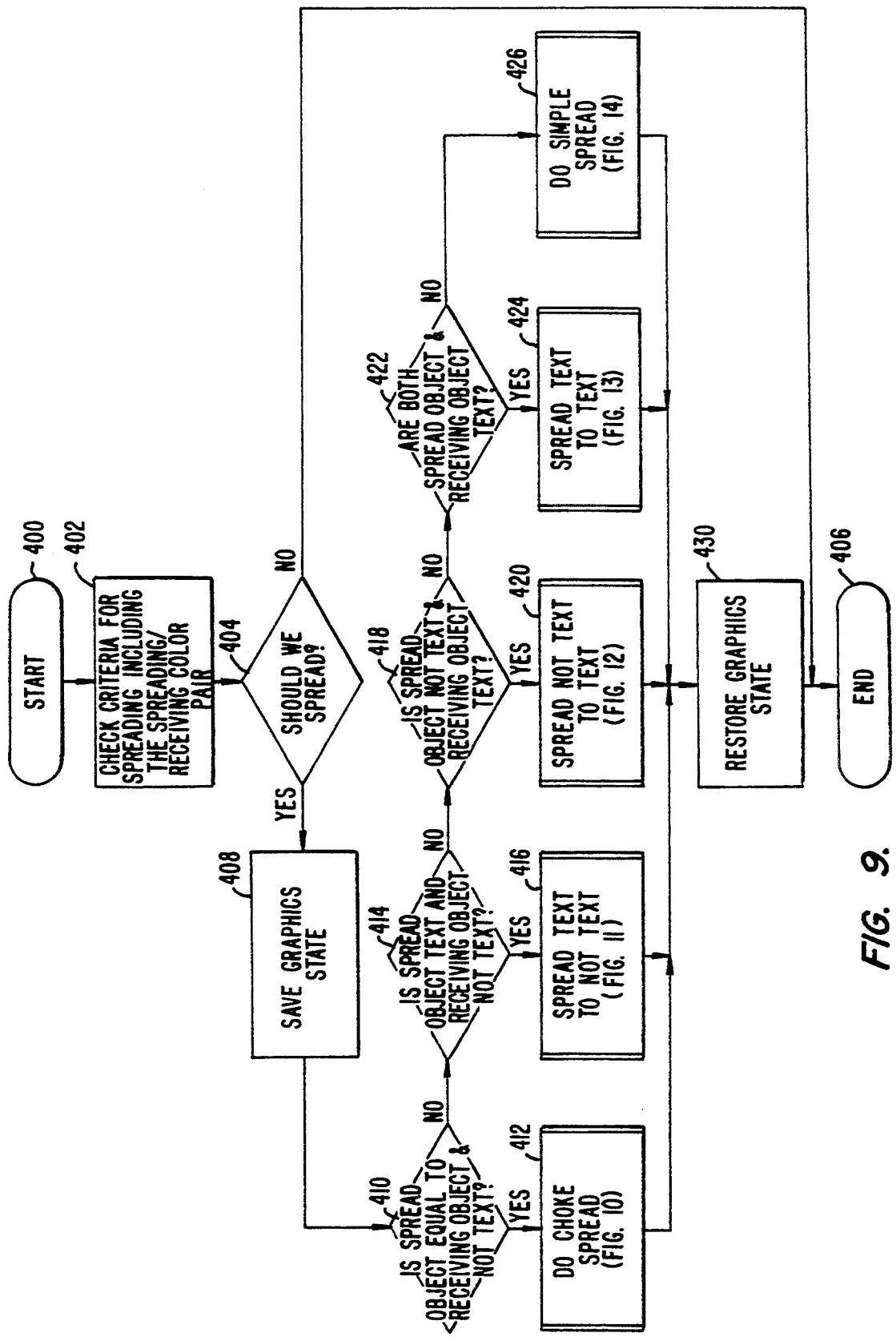
FIG. 9 is a flowchart illustrating operation of a routine, called by RenderSpreadAgainst via the routine "prim_intersect_spread_func" and identified as "TrySpeading", of the source code of Appendix I.

FIG. 9 is a flowchart illustrating operation of a routine, called by veRenderSpreadAgainst and identified as "TrySpreading", of the source code of Appendix I. The TrySpreading routine includes a set of steps called by the steps 362, 364 and 366 of FIG. 8. The TrySpreading routine includes a subroutine identified as "ShouldSpreadAgainst" that determines if a spread zone should spread against a receiving zone. This subroutine searches the spread object's spread table backwards for an entry which matches the parameters of the spread zone and the receiving zone. Searching in a preferred direction, that is, backwards in the preferred embodiment, is required as multiple entries in the spread object's spread table may match the particular parameters.

Calling the TrySpreading routine executes step 400 through step 406. After starting at step 400, the routine checks criteria for spreading at step 402. The check includes comparison of a particular spreading/receiving color pair as identified in the spread table. Step 404 determines a result of the check, executed by the routine ShouldSpreadAgainst. If no spreading should occur, the routine branches to step 406, end, and returns to the routine calling TrySpreading.

If a spread incidence exists, the routine branches from the step 404 to save the present resident graphics state. The preferred embodiment makes use of the clipping mechanism in a short term fashion to obtain a desired spreading result. Therefore, by saving the resident graphics state prior to clipping, the preferred embodiment is able to restore the graphics state when spreading is complete.

After saving the resident graphics state, the TrySpreading routine begins testing for the type of objects being spread. This allows for various type-specific optimizations to be implemented. In step 410, the routine checks whether the spreading object is equal to the receiving object, and additionally checks that this object is not a text object. If these conditions are met, the routine proceeds to call the "DoChokeSpread" routine in step 412. Otherwise, if the spreading object is text and the receiving object is not text (step 414), the routine calls "SpreadTextToNotText" in step 416. Otherwise, if the spreading object is not text and the receiving object is text (step 418), the routine calls "SpreadNotTextToText" in step 420. Otherwise, if the spreading object is text and the receiving object is text (step 422), the routine calls "SpreadTextToText" in step 424. Finally, if none of these conditions are satisfied, step 426 is followed, which calls "DoSimpleSpread". Then, regardless of which spreading routine is used, "TrySpreading" completes by restoring the graphics state in step 430.

Figure 10:
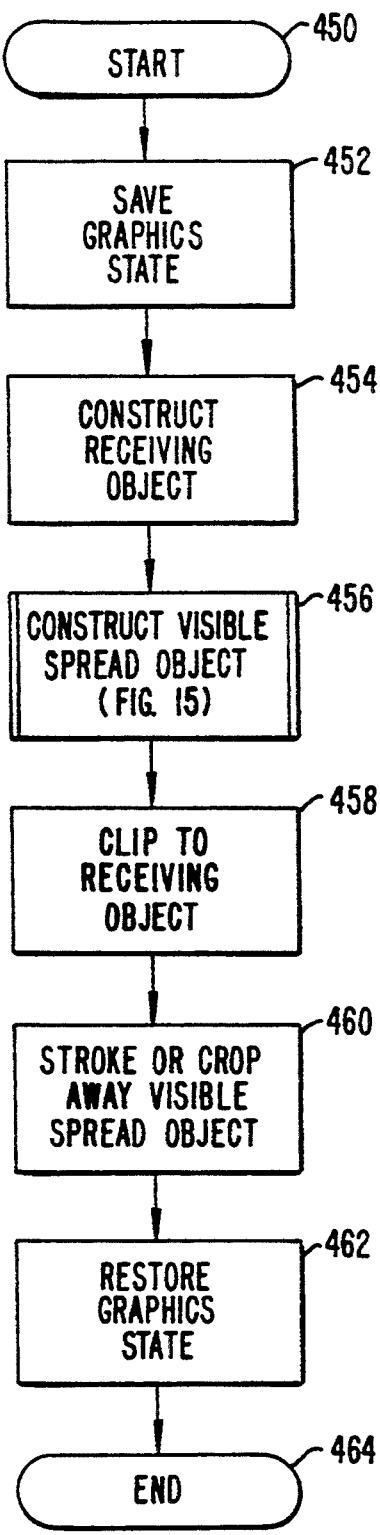
FIG. 10 is a flowchart illustrating operation of a routine, called by "TrySpreading" and identified as "DoChokeSpread", of the source code of Appendix I.

FIG. 10 is a flowchart illustrating operation of a routine, called by TrySpreading and identified as "DoChokeSpread", of the source code of Appendix I. The DoChokeSpread routine is called by step 412 of FIG. 9. The DoChokeSpread routine begins by saving the graphics state in step 452. It constructs the receiving object in the step 454 and the visible spread object in step 456. Step 456 is a complex step which is implemented with a call to a "SetClippedPrimPath" routine, and subtracts any intervening and obstructing objects from the spread object. The step 454 also calls SetClippedPrimPath to construct its object; however in this step the routine sets a flag to prevent obstructors from being subtracted.

After constructing the visible spread object at step 456, the TrySpreading routine clips to the receiving zone by intersection of the current clip object with the receiving zone at step 458. Then, the spreading boundary is stroked with spread color having spread width (step 460) if spreading, or cropped away if choking. The visible spread object is a temporary path deleted after the step 460 stroking. Upon restoring the graphics state, the preferred embodiment returns to the routine calling TrySpreading by advancing to step 464.

Figure 11:
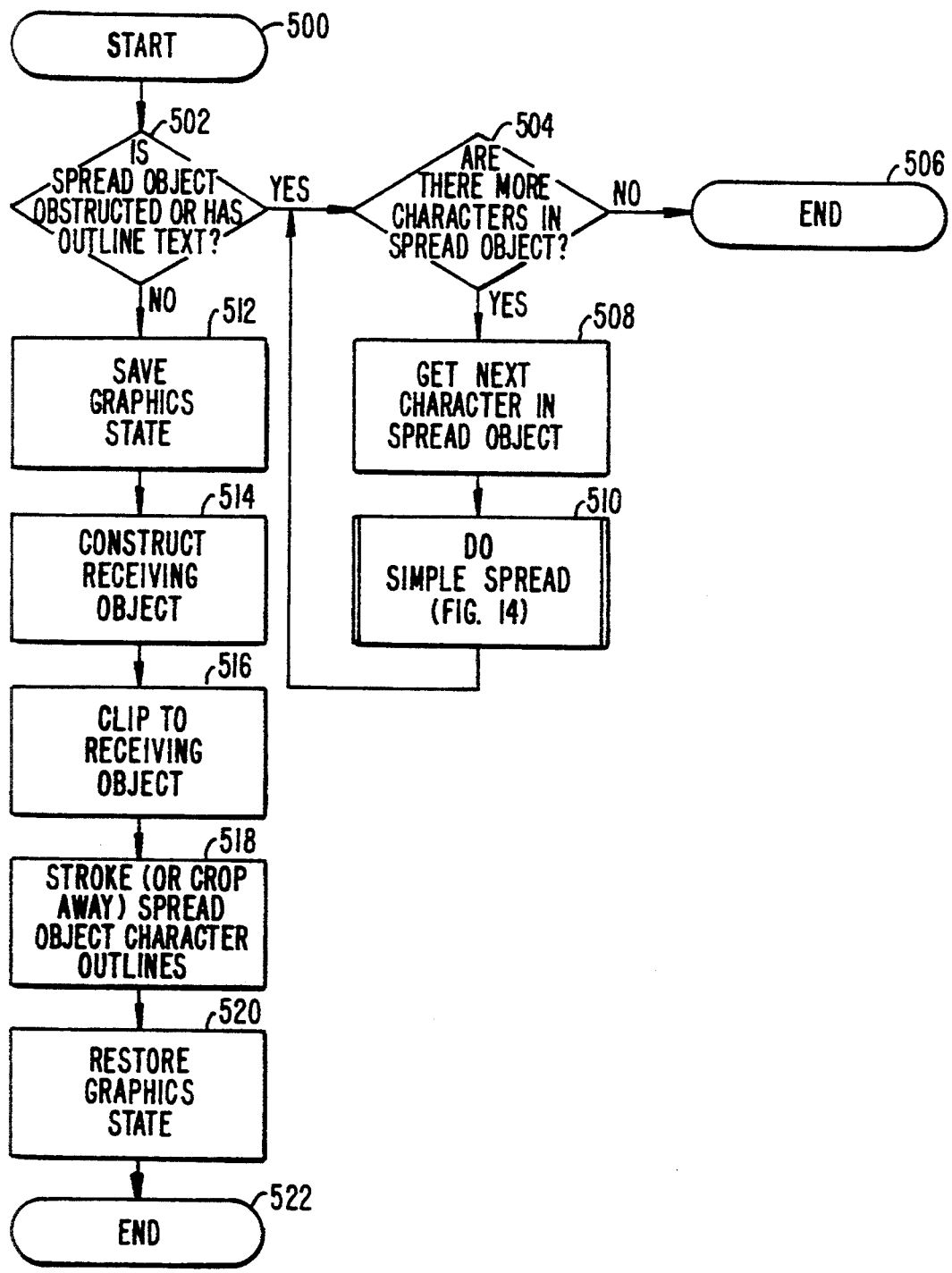
FIG. 11 is a flowchart illustrating operation of a routine, called by "TrySpreading" and identified as "SpreadTextToNotText", of the source code of Appendix I.

FIG. 11 is a flowchart illustrating operation of a routine, called by TrySpreading and identified as "SpreadTextToNotText", of the source code of Appendix I. The SpreadTextToNotText routine is called by step 416 of FIG. 9. It begins by testing whether the spreading text is either obstructed or includes outline text. If either of these conditions are met, the routine then proceeds to process the characters in the spreading text one by one. After getting the next spreading character in step 508, the routine calls "DoSimpleSpread" with that character object in step 510. Then, SpreadTextToNotText checks for the existence of another character in the list from the spreading object in step 504. If there are more characters, the routine repeats steps 508 and 510. When all characters have been processed, the routine terminates in step 506.

However, if in SpreadTextToNotText, the spread object is not obstructed and also is not outline text, a different pathway is followed. The graphics state is first saved in step 512. Then the receiving object is constructed in step 514 (refer to step 454 of FIG. 10), and the routine clips to this receiving object in step 516. Then, the spreading object character outlines are stroked if spreading, or cropped away if choking, in step 518. Finally, the routine restores the graphics state in step 520 and exits in step 522.

Figure 12:
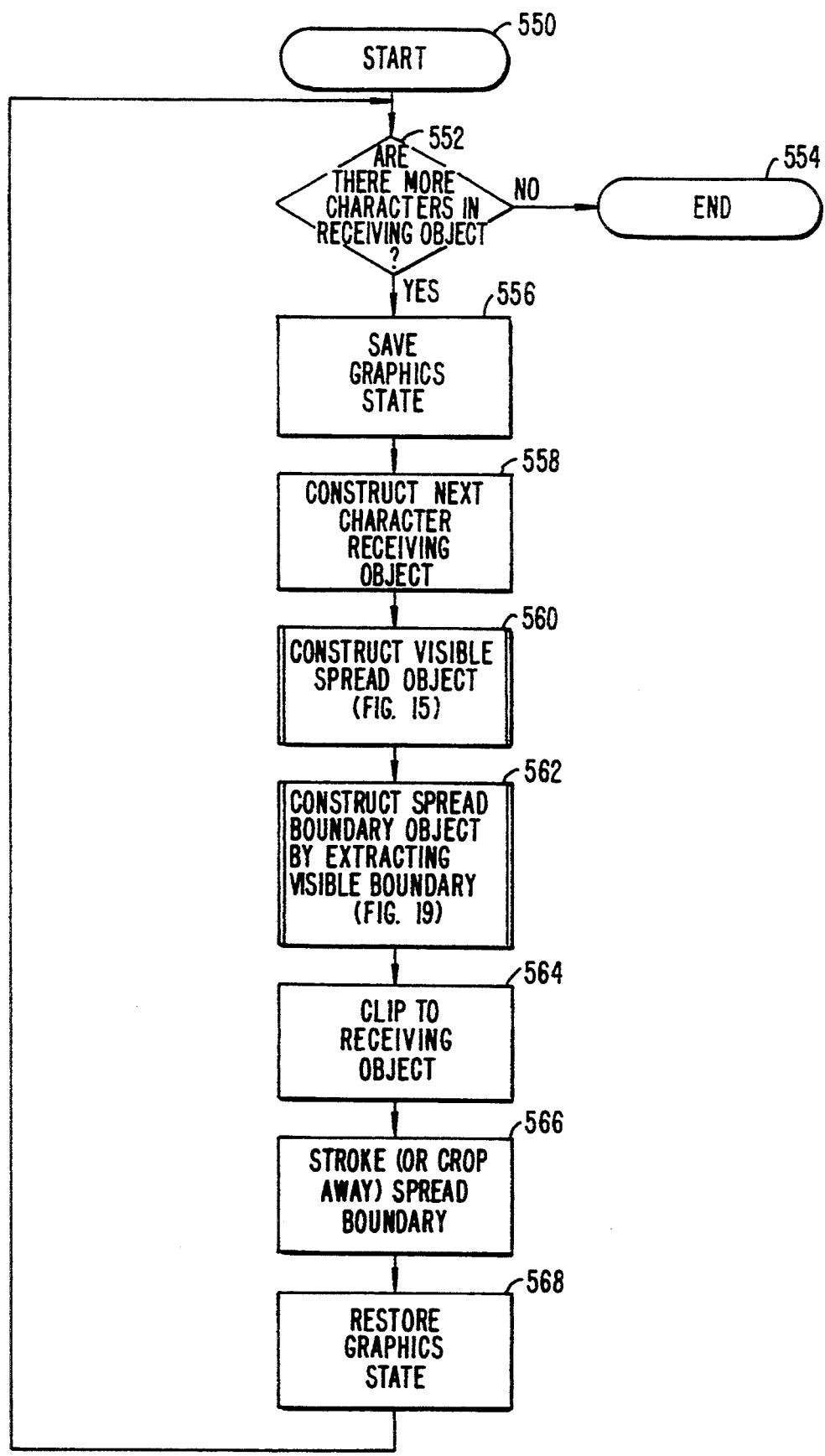
FIG. 12 is a flowchart illustrating operation of a routine, called by "TrySpreading" and identified as "SpreadNotTextToText", of the source code of Appendix I.

FIG. 12 is a flowchart illustrating operation of a routine, called by TrySpreading and identified as "SpreadNotTextToText", of the source code of Appendix I. The SpreadNotTextToText routine is called by step 420 of FIG. 9. It begins in step 552 by testing for more unprocessed characters in the receiving object. If so, the graphics state is saved in step 556. Then, the routine constructs an individual receiving object from the next unprocessed character in step 558 (see step 454 of FIG. 10), and constructs the visible spread object in step 560 (see step 456 of FIG. 10). Next, in step 562 a spread boundary object is constructed by extracting the visible boundary needing to spread from the receiving and spreading objects. Step 564 clips to the receiving object, and step 566 either strokes or crops away the spread boundary. The routine then restores the graphics state in step 568, and returns to step 552 where it tests for the existence of any remaining unprocessed characters in the receiving object. If not, the routine terminates in step 554. Otherwise, the loop continues until all characters are processed.

Figure 13:
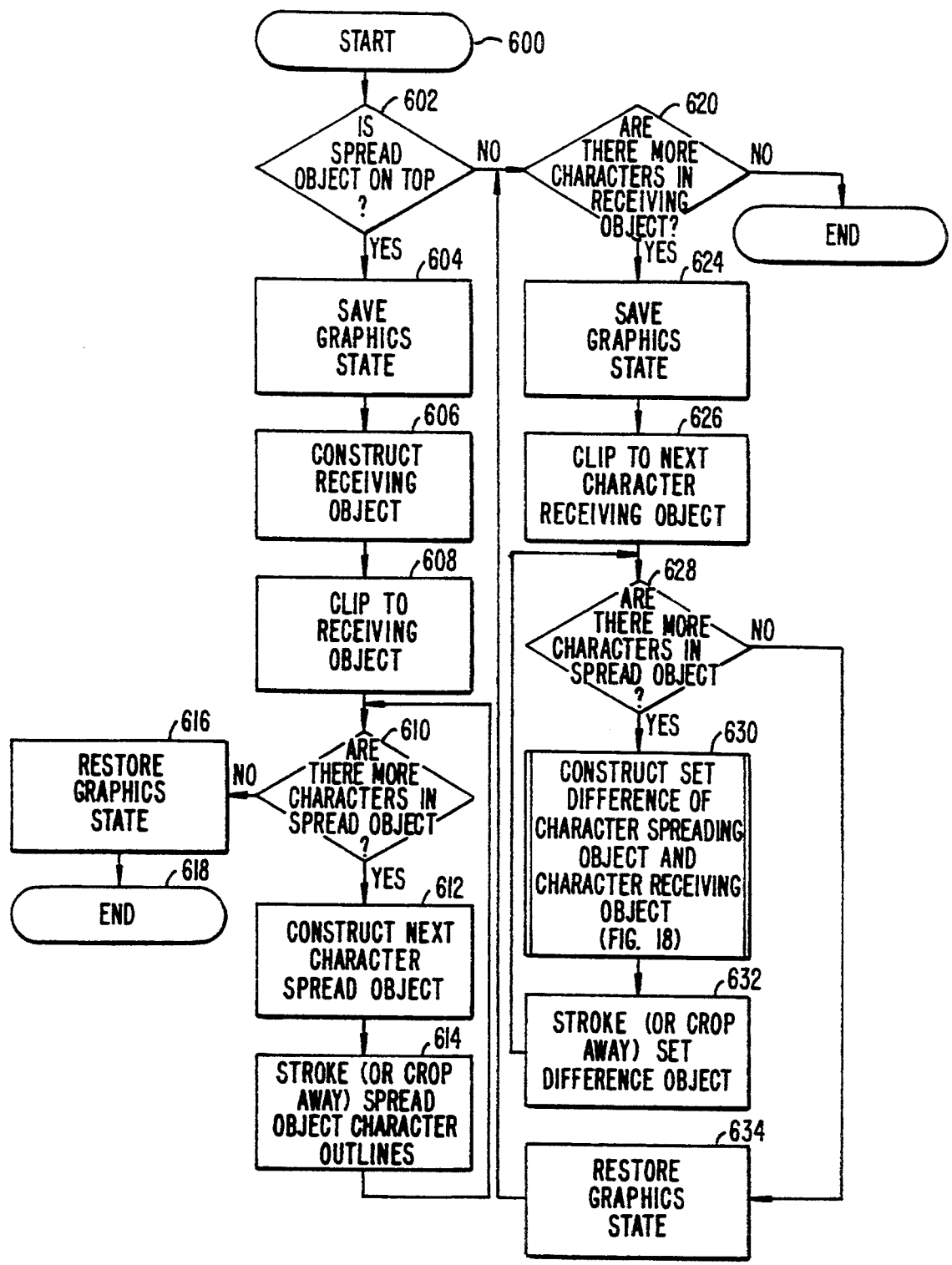
FIG. 13 is a flowchart illustrating operation of a routine, called by "TrySpreading" and identified as "SpreadTextToText", of the source code of Appendix I.

FIG. 13 is a flowchart illustrating operation of a routine, called by TrySpreading and identified as "SpreadTextToText", of the source code of Appendix I. The SpreadTextToText routine is called by step 424 of FIG. 9. In step 602, it chooses between two processes, depending upon whether the spreading text is on top or underlying the receiving text.

If the spreading text is on top, then the routine begins similarly to the others above by first saving the graphics state (step 604), constructing the receiving object (step 606), and clipping to the receiving object (step 608). Then, the next character in the spreading object is isolated as an object in step 612. Step 614 either strokes the character outlines or crops them away, depending on whether the routine is being used for spreading or choking. Step 610 then checks whether there are more unprocessed characters in the spread object. If so, the loop repeats until none are left. When the test in step 610 finally determines that all spreading characters have been processed, then the graphics state is restored in step 616 and the routine terminates in step 618.

If the spreading text is not on top, but rather underlies the receiving text, then step 620 verifies that there are unprocessed characters in the receiving object. If so, then the process begins by saving the graphics state (step 624) and clips to the object comprising the next character in the receiving text. Then step 628 tests whether there are more unprocessed characters in the spreading object. If so, step 630 constructs an object from the set difference between the character spreading object and the character receiving object, and step 632 will either stroke or crop away the set difference object. Then the process returns to step 628 to test for the existence of remaining characters in the spread object. The process repeats until all spreading characters are processed. Once that is complete as verified by step 628, then the routine restores the graphics state in step 634. The process returns to step 620 where the existence of remaining unprocessed receiving characters is tested. If more remain, steps 624 through 634 are repeated until none remain, as verified by step 620. Upon completion, the routine exits in step 622.

Figure 14:
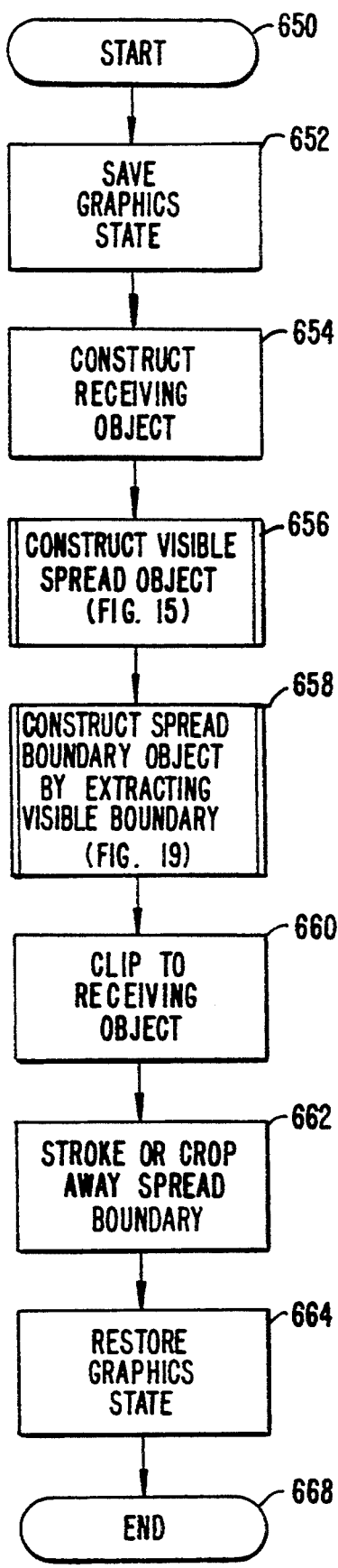
FIG. 14 is a flowchart illustrating operation of a routine, called by "TrySpreading" and identified as "DoSimpleSpread", of the source code of Appendix I.

FIG. 14 is a flowchart illustrating operation of a routine, called by TrySpreading and identified as "DoSimpleSpread", of the source code of Appendix I. The DoSimpleSpread routine is called by step 426 of FIG. 9. It starts at step 650, then saves the graphics state in step 652. The receiving object is constructed (step 654), then the visible spread object is constructed (step 656). Next, in step 658 a spread boundary object is constructed by extracting the visible boundary needing to spread from the receiving and spreading objects. Step 660 clips to the receiving object, and step 662 either strokes or crops away the spread boundary. The routine then restores the graphics state in step 664 and concludes in step 668.

Figure 15:
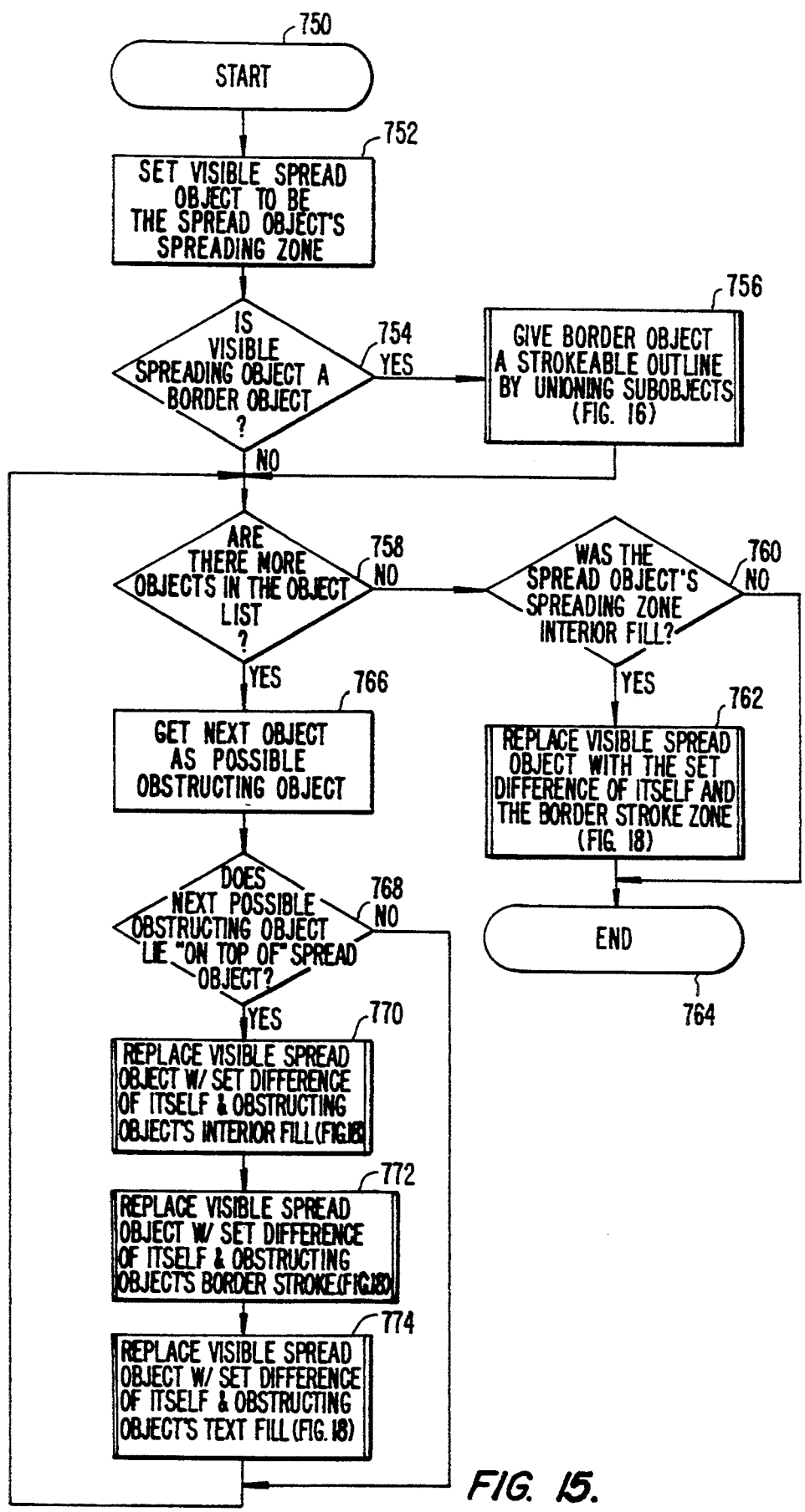
FIG. 15 is a flowchart illustrating operation of a routine, called by "DoChokespread" "SpreadNotText-ToText" "SpreadTextToText", and "DoSimpleSpread", and identified as "SetClippedPrimPath", of the source code of Appendix I.

FIG. 15 is a flowchart illustrating operation of a routine, called by TrySpreading and identified as SetClippedPrimPath, of the source code of Appendix I. The SetClippedPrimPath routine includes a set of steps called by the step 456 of FIG. 10, step 560 of FIG. 12, and step 656 of FIG. 14.

Calling the SetClippedPrimPath routine executes step 750 through step 764. After starting at step 750, the routine sets a visible spread object equal to the spread object's spreading zone at step 752. If this initial visible spread object originated from a border zone, as tested in step 754, it is converted to an equivalent object with a strokeable outline by performing set union on the object's subobjects at step 756. This is implemented in a called subroutine "VePutPrimPath" via "vePutBorderZone," "veStrokeOutline" and "GPSstrokeoutline", that calls the routine "GPS_self_union_path", that in turn calls the subroutines performing the self-union operation (see FIG. 16).

The SelfClippedPrimPath routine performs its subtracting operations on each obstructing object; therefore it uses the object list. At step 758, the routine checks to determine if there are more objects in the object list. If there are no more objects, the routine determines if the spread object's spreading zone was an interior fill at step 760. Step 64, end, returns to the calling routine if the spread object's spreading zone was not interior fill. Otherwise, at step 762, the routine replaces the visible spread object with a set difference of itself and the border stroke zone. This is implemented using the subroutines "veGPSdifferenceupaths", "GPSdifferenceupaths", that calls "GPS_difference_paths", that in turn calls the subroutines performing the difference operation (see FIG. 18). After the replacement of the visible spread object at step 762, the routine advances to step 764 to return to the calling routine.

The union, intersection, difference, and edge extraction subroutines result from novel extensions to a polygon comparison algorithm published by Kevin Weiler in Computer Graphics, Vol. 14, #3, July 1980, pp. 10–18. The article's title is "Polygon comparison using a graph representation." The article is hereby expressly incorporated by reference for all purposes. Further description of the Weiler algorithm and the extensions will be made in reference to a description of FIG. 16 through FIG. 20.

If the object list check of step 758 had indicated additional objects were in the object list, the routine would get the next object as a possible obstructing object at step 766. Step 768 determines if the next possible obstructing object overlies the spread object. If the possible obstructing object does not overlie the spread object, the routine returns to step 758 to check for more possible obstructing objects.

However, if the possible obstructing object overlies the spread object, the routine replaces the visible spread object with a set difference of itself and the obstructing object's interior fill at step 770. After step 770, the routine replaces the visible spread object with a set difference of itself and the obstructing object's border stroke at step 772. After step 772, the routine replaces the visible object with a set difference of itself and the obstructing object's text fill at step 774. The routine thereafter returns to step 758 to determine if there possibly could be more obstructing objects.

Figure 16:
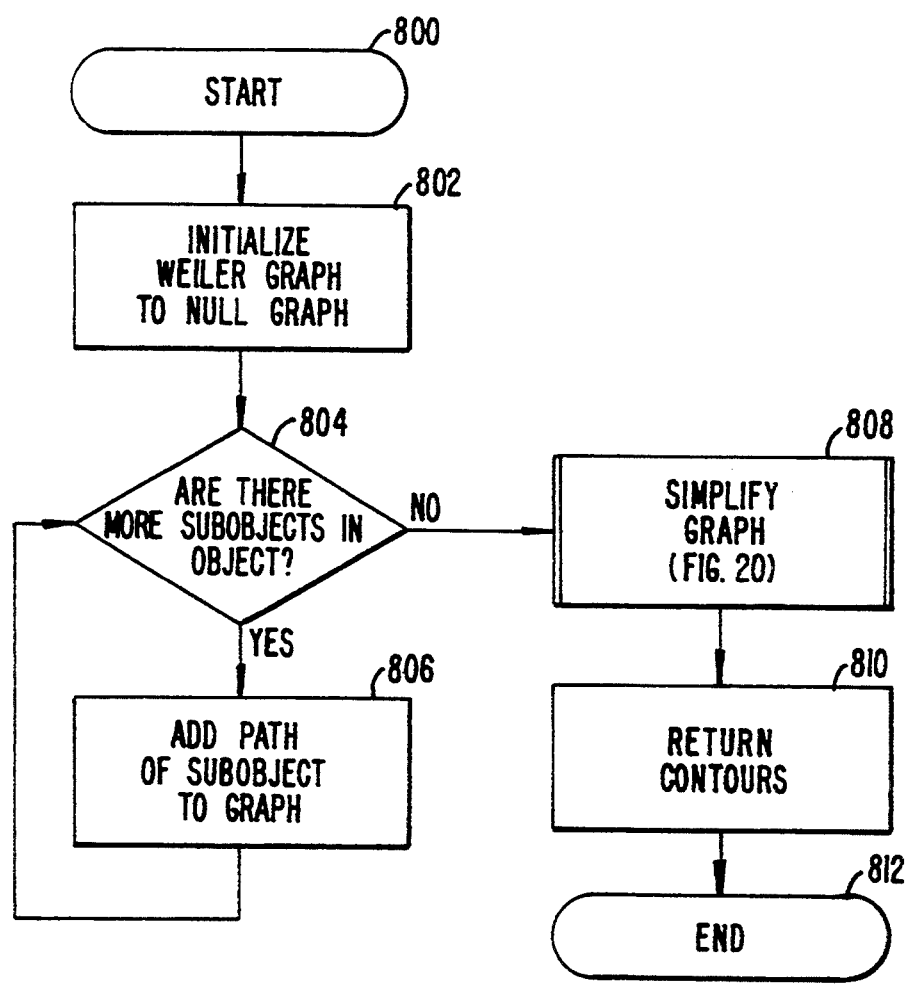
FIG. 16 is a flowchart illustrating operation of a routine, called by "SetClippedPrimPath" via "VePutPrimPath", "vePutBorderZone", "veStrokeOutline", and "GPSstrokeoutline", and identified as "GPS_self_union_path", of the source code of Appendix I.

FIG. 16 is a flowchart illustrating operation of a routine, called by SetClippedPrimPath via "vePutPrimPath", "veStrokeOoutline" and "GPSstrokeoutline" and identified as "GPSunionpath" of the source code of Appendix I. This routine includes a set of steps called by the step 756 of FIG. 15.

Calling the GPSunionpath executes step 800 through step 812. After starting at step 800, the routine initializes a Weiler graph to a null graph at step 802. The Weiler algorithm generates a planar graph that is a combination of all polygons from a set of input polygons. The Weiler algorithm extracts an appropriate subset of the graph according to a particular specified object set operation. The preferred embodiment uses object paths defining objects that are able to include curved path segments. To apply the Weiler algorithm, the preferred embodiment polygonizes the paths before using the set operation subroutines.

Planar graphs comprise a collection of edges and vertices. The set of vertices in the graph is the collection of all the vertices in the input polygons, plus a vertex for each intersection of edges between the input polygons. The set of edges in the graph is the collection of all the edges from the input polygons, divided at any new vertices formed from edge intersections.

The Weiler algorithm maintains information for each edge as it creates the graph. The information indicates which input polygons were bounded by any particular edge. As the graph is planar, the graph divides the plane into non-intersecting regions, each of which is entirely contained within some of the input polygons. The Weiler algorithm also constructs a tree data structure indicating containment relationships between the regions. Subsequently, from the containment tree and information related to the edges bounding a particular region, the algorithm determines a subset of input polygons containing each particular region. The Weiler paper describes the regions as contours.

The preferred embodiment of the present invention includes and implements a modified Weiler algorithm. The modifications simplify the planar graph after its construction. Additionally, the implementation allows the extraction of common edges between visible portions of the input object paths, where the visible portions are determined using rendering order to prioritize objects. Details of implementation of the Weiler algorithm, as well as the modification thereto, are shown in the flowcharts and contained within the implementation of the C language of the Appendix I.

After initializing the Weiler graph at step 802, the routine checks to see if there are any more subobjects, or object subpaths, to be added to the graph at step 804. If there is another object subpath to add, the preferred embodiment uses a standard Weiler implementation to add the object subpath to the graph at step 806. Otherwise, the routine simplifies the graph in step 808. After simplification, the contours of the remaining graph correspond to the outline of the set union of all the subpaths of the starting object. These contours are then returned to the calling routine in step 810. Step 812 returns the routine to the calling routine.

Figure 17:
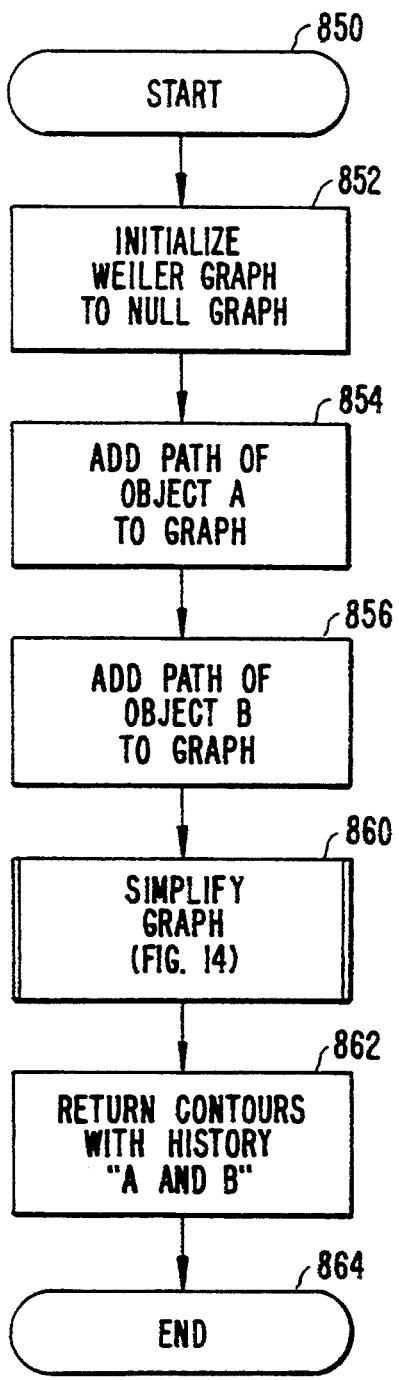
FIG. 17 is a flowchart illustrating operation of a routine, called by "DoChokeSpread", "SpreadTextToNotText", "SpreadNotTextToText", "SpreadTextToText", and "DoSimpleSpread", via "GPSclip", and identified as "GPS_intersect_paths", of the source code of Appendix I.

FIG. 17 is a flowchart illustrating operation of a routine, called by TrySpreading via GPSclip and identified as "GPS_intersect_paths", of the source code of Appendix I This routine includes a set of steps called by the step 458 of FIG. 10, step 516 of FIG. 11, step 564 of FIG. 12, steps 608 and 626 of FIG. 13, and step 660 of FIG. 14.

Calling the GPS_intersect_paths routine executes step 850 through step 864. After starting at step 850, the routine initializes a Weiler graph to a null graph.

After initializing the Weiler graph at step 852, the routine adds two input object paths, the object paths to be intersected, to the graph, at steps 854 and 856. The preferred embodiment uses a standard Weiler implementation to build the graph from the two input object paths. The graph is then simplified at step 860. After simplification, the contours for regions corresponding to an intersection of the two input object paths are returned to the calling routine at step 862. Step 864 returns the routine to the calling routine.

Figure 18:
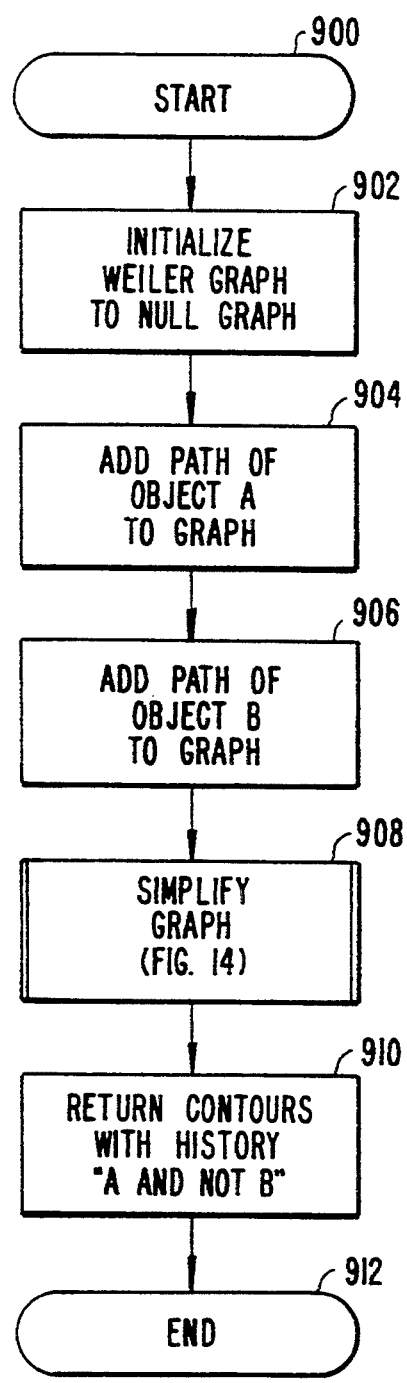
FIG. 18 is a flowchart illustrating operation of a routine, called by "SetClippedPrimPath" via "prim_intersect_obstruct_func", "veGPSdifferenceupaths", and "GPSdifferenceupaths", and identified as "GPS_difference_paths", of the source code of Appendix I.

FIG. 18 is a flowchart illustrating operation of a routine, called by SetClippedPrimPath via "prim_intersect_obstruct_func", "veGPSdifferenceupaths", and "GPSdifferenceupaths" and identified as "GPS difference_paths", of the source code of Appendix I. This routine includes a set of steps called by the steps 762, 770, 772 and 774 of FIG. 15.

Calling the GPS_difference_paths routine executes step 900 through step 912. After starting at step 900, the routine initializes a Weiler graph to a null graph at step 902.

After initializing the Weiler graph at step 902, the routine adds two input object paths, the object paths to determine a set difference from, to the graph, at steps 904 and 906. The preferred embodiment uses a standard Weiler implementation to build the graph from the two input object paths. The graph is then simplified at step 908. After simplification, the contours for regions corresponding to a set difference of the two input object paths are returned to the calling routine at step 910. Step 912 returns the routine to the calling routine.

Figure 19:
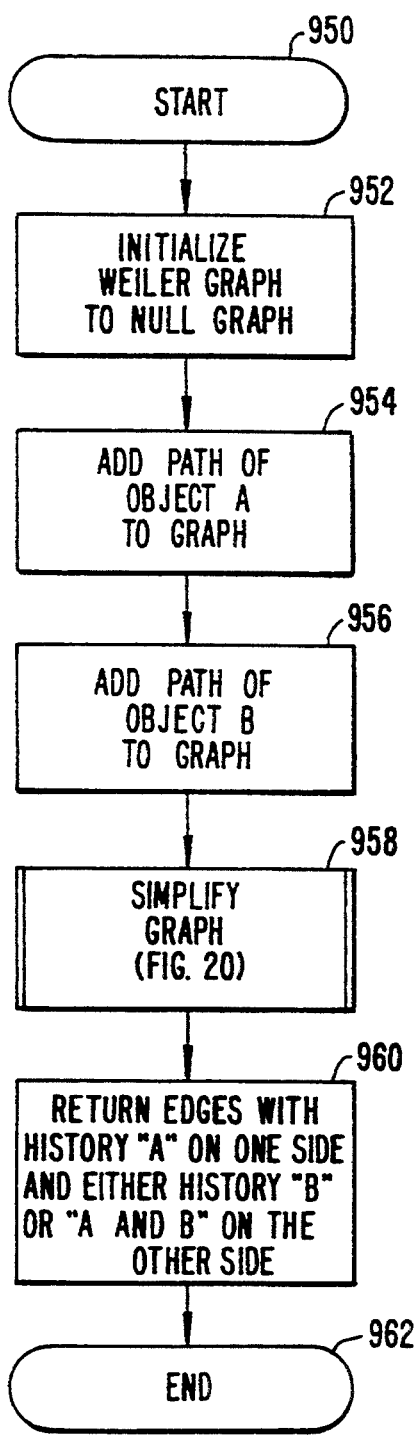
FIG. 19 is a flowchart illustrating operation of a routine, called by "SpreadNotTextToText" and "DoSimpleSpread", via "GPSspreadupaths", and identified as "GPS_get_common_edges", of the source code of Appendix I.

FIG. 19 is a flowchart illustrating operation of a routine, called by SpreadNotTextToText and DoSimpleSpread via "GPSspreadupaths" and identified as "GPS_get_common_edges", of the source code of Appendix I. This routine includes a set of steps called by the step 562 of FIG. 12 and the step 658 of FIG. 14.

Calling the GPS_get_common-edges routine executes step 950 through step 962. After starting at step 950, the routine initializes a Weiler graph to a null graph at step 952. Then, the routine adds the two input paths in steps 954 and 956. The preferred embodiment uses a standard Weiler algorithm to generate the graph from the input paths; the graph is simplified in step 958. After simplification, the contours for the common spread boundary between the two input object paths are returned to the calling routine at step 960. The routine terminates at step 962.

The routines shown in FIG. 17 and in FIG. 19 are similar, differing in the particular type of set operation performed, that is, which contour to return to the calling routine.

Figure 20:
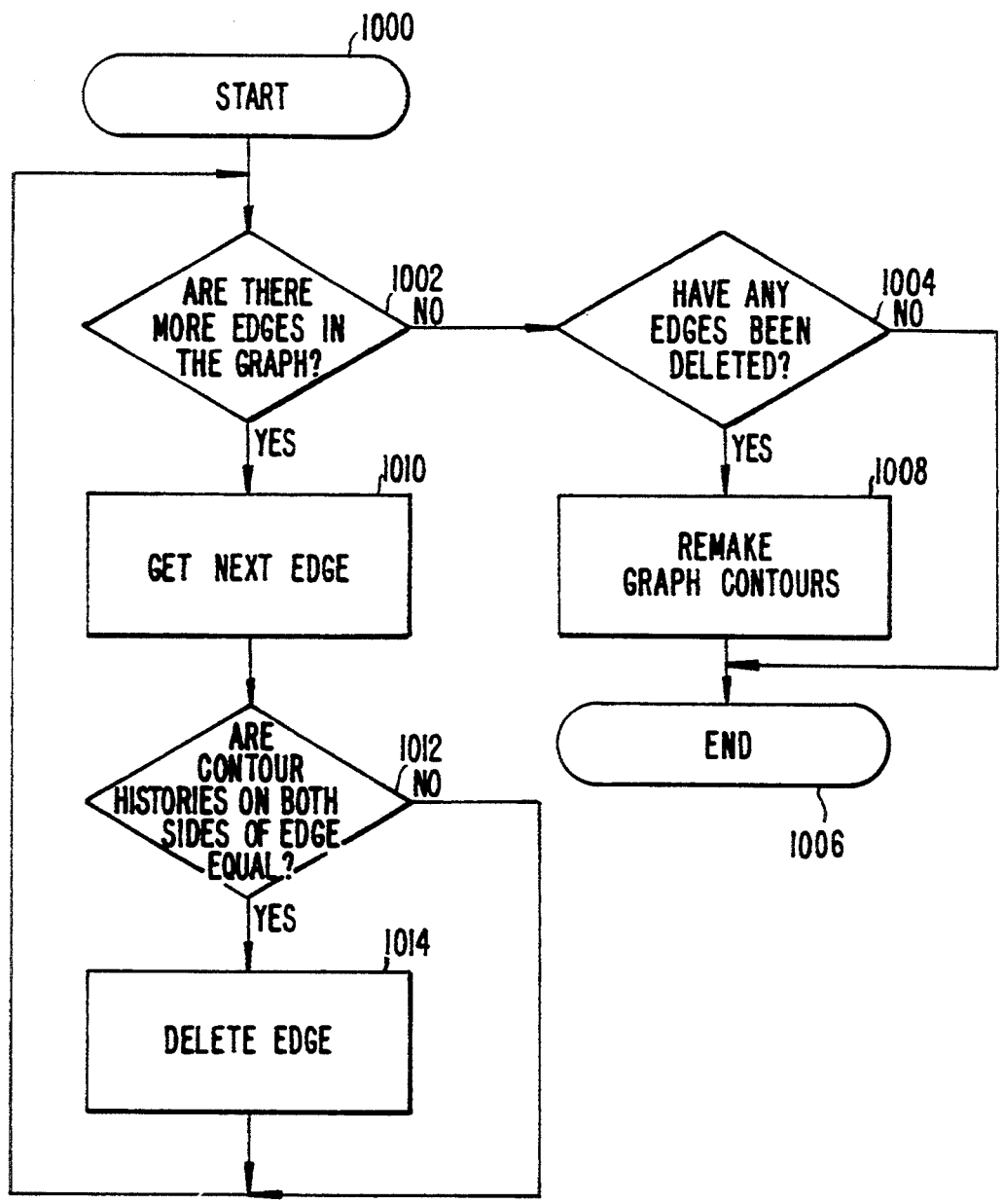
FIG. 20 is a flowchart illustrating operation of a routine, called by "GPS_self_union_path", "GPS_intersect_paths", "GPS_difference_paths", and "GPS_get_common_edges", via "GPS_PathComp-GetPath", and identified as "pc_simplify", of the source code of Appendix I.

FIG. 20 is a flowchart illustrating operation of a routine, called by GPS_difference_paths, GPS_intersect_paths, GPS_get_common_edges, and GPSunionPath via "GPS_PathCompGetPath" and identified as "pc_simplify" of the section pcomp.c of the source code of Appendix I. This routine includes a set of steps called by the step 808 of FIG. 16, step 860 of FIG. 17, step 908 of FIG. 18, and step 958 of FIG. 19.

Details of the simplification routine pc_simplify follow. In the C code, an instance of the C structure "graph" represents the planar graph, while an instance of "edge" represents edges of the planar graph. The edge structure includes the first two entries, "succ" and "pred", which implement a doubly-linked list of all edges in the planar graph. The head to this list is the graph structure itself, which is linked in by having a "succ" and a "pred" which are edges.

The simplification routine inspects each edge in the graph by traversing this linked list of edges sequentially. This traversal is implemented by the "for" statement in the routine pc_simplify inside the "else" clause of the first "if" statement. When an edge is inspected, the history, or set of polygons contributing to the region on each side of the edge, are compared. If the histories are equal, the edge does not separate two different types of regions. The edge can be eliminated. The test and edge deletion are implemented in the code by the "if" statement inside the "for" statement, comparing the "hc" members of the contours of each edge for equality, and the following call to "pc_delete_edge" which removes the edge from the graph.

After inspecting all edges, if any edges were deleted, the number and shapes of the regions formed by the graph have changed. This requires rebuilding the contour tree. The rebuilding of the contour tree is a standard Weiler algorithm function and will not be further explained herein. The rebuilding step is important after deleting the non-necessary edges. The routine "pc_make_contours" following a call to pc_simplify remakes the graph contours.

Calling the pc_simplify routine executes step 1000 through step 1006. After starting at step 1000, the routine begins the traversal of the linked list at step 1002. Step 1002 determines if any edge in the graph remains to be compared. If there are no more edges, the routine determines if any edges were deleted at step 1004. If there are no more edges and no edges were deleted, the routine advances to step 1006 to return to the calling routine. If one or more edges were deleted, the routine remakes the graph contours at step 1008.

In traversing the doubly linked list, that is the determination at step 1002 indicates that additional edges exist, the routine gets the next edge at step 1010. The routine checks, at step 1012, whether contour histories on both sides of the selected edge are equal. If they are not equal, the routine advances to step 1002 to determine if any more edges in the list remain to be checked.

However, if at step 1012 the histories were equivalent on both sides of the selected edge, the routine deletes the edge from the graph at step 1014 and thereafter returns to step 1002 to check for more edges.

Conclusion

In conclusion, the present invention offers advantages over prior art systems. The use of set union, intersection, difference, and edge extraction for overlapping objects to extract a visible strokeable path allows spreading and choking in more situations than in the prior art. The spread table to establish spread incidences and to define a knockout print for the spread having a specified width of a specified color allows flexibility in defining a spread.

While the above is a complete description of the preferred embodiment of the present invention, various alternatives, modifications and equivalents are possible. For example, instead of stroking the visible spread boundary after clipping to the receiving object, one could (less efficiently) construct a new object from the set intersection of the stroke of the visible spread boundary and the receiving object, and fill that new object. Also, one could imagine implementing the present invention with a different page description language than PostScript. Therefore, the above description does not limit the scope of the present invention. The appended claims define the scope of the invention.

What is claimed is:

1. A method for spreading a first object into a second object with a page description language defining the first and second objects on a page of a display medium, comprising the steps of:

defining a temporary third object from a portion of the first object that would be visible after rendering the first object, the second object and any obstructing objects;

defining a temporary fourth object that includes a spreading edge between said temporary third object and said second object; and rendering a portion of said temporary fourth object intersecting said second object.

2. The method of claim 1 wherein said temporary third object defining step further comprises the steps of:

defining an initial temporary object equivalent to the first object; and subtracting, for an object overlapping the first object, said overlapping object from said initial temporary object to produce a refined temporary object.

3. The method of claim 2 wherein said subtracting step includes a set difference procedure of combining said refined temporary object with said obstructing object.

4. The method of claim 1 wherein said temporary fourth object defining step further comprises the step of defining said spreading edge to be an edge common to a boundary of both said temporary third object and said second object.

5. The method of claim 1 wherein said rendering step further comprises the step of:
rendering said temporary fourth object with a spread color having a spread width.

6. The method of claim 5 wherein said rendering step further comprises the step of:
rendering, using a knockout print option, said temporary fourth object with a spread color having a spread width.

7. The method of claim 5 wherein said rendering step further comprises the step of:
rendering, using an overprint print option, said temporary fourth object with a spread color having a spread width.

8. The method of claim 1 further comprising the step of deleting said temporary objects.

9. A spreading method, comprising the steps of:
defining a plurality of objects using a page description language that renders said plurality of objects on a page of a display of a display medium, each said object having at least a single zone;
providing a first object of said plurality of objects with a spread table defining a spread zone, a spread zone color, a receiving zone, a receiving zone color, a spread width, and a spread color for an overlapping portion of said first object and another one of said objects;
comparing each zone of said first object and each overlapping zone of a second object of said plurality of objects with said spread table to establish a spread incidence for spreading said spread zone of said first object to a receiving zone of said second object;
generating a temporary third object defined by subtracting any obstructing objects overlying said spread zone;
generating a temporary fourth object defined by a common edge between said temporary third object and said second object;
rendering a portion of said temporary fourth object intersecting said receiving zone of said second object with said spread color having said spread width; and
deleting said temporary objects.

10. The spreading method of claim 9 wherein said defining step for each object further comprises at least one of the steps of:
defining a border zone from the outline of the stroke of the object;
defining a fill zone from the interior of the object; and
defining a text zone from the text character outlines.

11. The spreading method of claim 9 wherein said rendering step includes the option of rendering using a knockout color.

12. The spreading method of claim 9 wherein said rendering step includes the option of rendering using an overprint color.

13. The spreading method of claim 1 wherein a spreading zone of the first object defines said first object, and the receiving zone of the first object defines said second object.

14. A method of generating a second strokeable object from a stroke of a first object, comprising the steps of:
defining a temporary object with subobjects which when filled results in the execution of said stroke of said first object; and
defining the second strokeable object by applying a set union procedure to the subobjects of the temporary object.

15. The method of claim 14 wherein said set union method includes the simplification step of removing all extraneous non-outline edges from said temporary object.

16. A method for spreading a first object into a second object by partially choking the second object, with a page description language defining the first and second objects on a page of a display medium, comprising the steps of:
defining a temporary third object from a portion of the first object that would be visible after rendering the first object, the second object, and any obstructing objects;
defining a temporary fourth object that includes a spreading edge between said temporary third object and said second object; and
cropping away from the second object, in a color separation, that portion of said temporary fourth object intersecting said second object.

17. The method of claim 16 wherein said temporary third object defining step further comprises the steps of:
defining an initial temporary object equivalent to the first object; and
subtracting, for each object overlapping the first object, said overlapping object from said initial temporary object having all said previously subtracted overlapping objects removed.

18. The method of claim 17 wherein said subtracting step includes a set difference method of combining the successively refined temporary object with each obstructing object.

19. The method of claim 16 wherein said temporary fourth object defining step further comprises the step of defining said spreading edge to be an edge common to a boundary of both said temporary third object and said second object.

20. The method of claim 16 wherein said cropping-away step further comprises the step of:
subtracting said temporary fourth object from said second object.

21. The method of claim 20 wherein said subtracting step includes a set difference procedure of combining said temporary fourth object with said second object.

22. The method of claim 16 further comprising the step of deleting said temporary objects.

23. A method for spreading a first object into a second object with a page description language defining the first and second objects on a page of a display medium, comprising the steps of:
defining a temporary third object from a portion of the first object that would be visible after rendering the first object, the second object and any obstructing objects;

defining a temporary fourth object that includes a spreading edge between said temporary third object and said second object; and defining a portion of said temporary fourth object intersecting said second object as a permanent object.

24. The method of claim 23 wherein said temporary third object defining step further comprises the steps of:

defining an initial temporary object equivalent to the first object; and subtracting, for an object overlapping the first object, said overlapping object from said initial temporary object to produce a refined temporary object.

25. The method of claim 24 wherein said subtracting step includes a set difference procedure of combining said refined temporary object with said obstructing object.

26. The spreading method of claim 24 wherein said temporary fourth object portion defining step includes the option of defining using an overprint color.

27. The method of claim 23 wherein said temporary fourth object defining step further comprises the step of defining said spreading edge to be an edge common to a boundary of both said temporary third object and said second object.

28. The method of claim 23 wherein said temporary fourth object portion defining step further comprises the step of:

defining said temporary fourth object portion with a spread color having a spread width.

29. The method of claim 27 wherein said temporary fourth object portion defining step further comprises the step of:

defining, using a knockout color, said temporary fourth object portion with a spread color having a spread width.

30. The method of claim 28 wherein said temporary fourth object portion defining step further comprises the step of:

defining, using an overprint color, said temporary fourth object portion with a spread color having a spread width.

31. The method of claim 23 further comprising the step of deleting said temporary objects.

32. The spreading method of claim 23 wherein a spreading zone of the first object defines said first object, and the receiving zone of the first object defines said second object.

33. A spreading method, comprising the steps of:

defining a plurality of objects using a page description language that renders said plurality of objects on a page of a display of a display medium, each said object having at least a single zone;

providing a first object of said plurality of objects with a spread table defining a spread zone, a spread zone color, a receiving zone, a receiving zone color, a spread width, and a spread color for an overlapping portion of said first object and another one of said objects;

comparing each zone of said first object and each overlapping zone of a second object of said plurality of objects with said spread table to establish a spread incidence for spreading said spread zone of said first object to a receiving zone of said second object;

generating a temporary third object defined by subtracting any obstructing objects overlying said spread zone;

generating a temporary fourth object including a common edge between said temporary third object and said second object;

defining a portion of said temporary fourth object intersecting said receiving zone of said second object with said spread color having said spread width; and deleting said temporary objects.

34. The spreading method of claim 33 wherein said defining step for each object further comprises at least one of the steps of:

defining a border zone from the outline of the stroke of the object;

defining a fill zone from the interior of the object; and defining a text zone from the text character outlines.

35. The spreading method of claim 33 wherein said temporary fourth object portion defining step includes the option of defining using a knockout color.

* * * * *